US009129238B2

(12) United States Patent
Chalana et al.

(10) Patent No.: US 9,129,238 B2
(45) Date of Patent: Sep. 8, 2015

(54) DYNAMIC WEB SERVICES WORK FLOW SYSTEM AND METHOD

(75) Inventors: Vishal Chalana, Panchkula (IN); Amit Sharma, Chandigarh (IN); Piyush Nagar, Chandigarh (IN); Jearld Waitkus, San Luis Obispo, CA (US); Vikram Chalana, Bothell, WA (US)

(73) Assignee: Winshuttle, LLC, Bothell, WA (US)

( * ) Notice: Subject to any disclaimer, the term of this patent is extended or adjusted under 35 U.S.C. 154(b) by 726 days.

(21) Appl. No.: 13/405,138

(22) Filed: Feb. 24, 2012

(65) Prior Publication Data

US 2012/0179503 A1 Jul. 12, 2012

Related U.S. Application Data

(63) Continuation-in-part of application No. 13/016,704, filed on Jan. 28, 2011, now Pat. No. 8,701,159.

(60) Provisional application No. 61/334,099, filed on May 12, 2010.

(51) Int. Cl.
*G06F 15/16* (2006.01)
*G06Q 10/06* (2012.01)

(52) U.S. Cl.
CPC ............ *G06Q 10/06* (2013.01); *G06Q 10/0631* (2013.01); *G06Q 10/0633* (2013.01); *G06Q 10/06311* (2013.01); *G06Q 10/06316* (2013.01); *G06Q 10/063112* (2013.01)

(58) Field of Classification Search
CPC ...... G06Q 40/00; G06Q 90/00; G06Q 10/067

USPC .................................................. 709/200–203
See application file for complete search history.

(56) References Cited

U.S. PATENT DOCUMENTS

| | | | |
|---|---|---|---|
| 2004/0030627 A1* | 2/2004 | Sedukhin ........................ 705/36 |
| 2006/0095274 A1* | 5/2006 | Phillips et al. .................... 705/1 |
| 2006/0247805 A1 | 11/2006 | Thomson et al. |
| 2008/0313003 A1 | 12/2008 | Racca et al. |
| 2009/0037914 A1 | 2/2009 | Chagoly et al. |
| 2010/0031232 A1 | 2/2010 | Glazier et al. |
| 2010/0319002 A1* | 12/2010 | Gosain et al. ................. 719/311 |
| 2011/0055254 A1 | 3/2011 | Symons et al. |

\* cited by examiner

*Primary Examiner* — Minh-Chau Nguyen
(74) *Attorney, Agent, or Firm* — AEON Law; Adam L.K. Philipp

(57) ABSTRACT

A Dynamic Web Service server may facilitate custom Enterprise Application interface development with little or no developer input by dynamically creating a web service for performing a particular transaction according to a transaction map. An Enterprise Application client device may create a transaction map by "recording" a transaction between an Enterprise Application client and an Enterprise Application server and mapping transaction fields to a custom interface generated to collect data for re-performing the recorded transaction. The Enterprise Application client device may call the dynamic web service, and the Dynamic Web Service server may then perform the recorded transaction using input data collected in the custom interface. Such a dynamic web service may be performed as part of an automated business process managed by a workflow server.

14 Claims, 23 Drawing Sheets

DYNAMIC WEB SERVICES WORK FLOW SYSTEM AND METHOD

CROSS REFERENCE TO RELATED APPLICATIONS

This application is a continuation-in-part of U.S. Non-provisional application Ser. No. 13/016,704, filed Jan. 28, 2011, titled "DYNAMIC WEB SERVICES SYSTEM AND METHOD," naming inventors Vishal Chalana, Amit Sharma, Piyush Nagar, Vishal Sharma, and Vikram Chalana. Application Ser. No. 13/016,704 claims the benefit of priority to U.S. Provisional Application No. 61/334,099, filed May 12, 2010, titled "DYNAMIC WEB SERVICES SYSTEM AND METHOD," naming inventors Vishal Chalana, Amit Sharma, Piyush Nagar, Vishal Sharma, and Vikram Chalana. The above-cited applications are incorporated herein by reference in their entireties, for all purposes.

FIELD

The present invention relates to databases, and more particularly to methods of defining and providing dynamic web services for automating database transactions.

BACKGROUND

Enterprise resource planning ("ERP") systems are designed to coordinate some or all of the resources, information, and activities needed to complete business processes. An ERP system may support business functions including some or all of manufacturing, supply chain management, financials, projects, human resources, customer relationship management, and the like.

Many ERP systems provide a native application programming interface ("API") that developers may use to read, write, update, and/or remove data objects on the database level. Some ERP systems may also provide a native API that developers may use for observing, automating, and/or emulating user interactions with the ERP system, such as through a graphical user interface ("GUI"). For example, ERP Servers provided by SAP AG of Weinheim, Germany, typically expose a native API via remote function calls ("RFC"). An RFC is a procedure for data interchange (typically via a TCP/IP connection) between a client (typically an SAP client) and a server (typically an SAP server).

In addition, some ERP systems may expose some or all of a native API as a general-purpose, static "web service," which can be accessed over a network, such as the Internet, and executed on a remote system hosting the requested services. When using such a web service, clients and servers commonly communicate over the Hypertext Transfer Protocol ("HTTP") protocol.

There are several web service variants. In one variant, which has been popular with traditional enterprise, clients and servers communicate via Extensible Markup Language ("XML") messages that follow the Simple Object Access Protocol ("SOAP") standard. In such systems, there is often a machine-readable description of the operations offered by the service written in the Web Services Description Language ("WSDL").

Another web service variant conforms to Representational State Transfer ("REST") constraints and uses HTTP methods such as PUT, GET, DELETE, and POST instead of SOAP messages. RESTful web services may or may not use WSDL definitions and/or XML or JavaScript Object Notation ("JSON") messages.

Moreover, many businesses operate an enterprise information portal ("EIP") for integrating business information, people and processes across organizational boundaries. Many EIP systems allow businesses to provide and/or manage facilities such as some or all of intranets, extranets, websites, document and file management, collaboration spaces, social tools, enterprise search, business intelligence, process integration, system integration, workflow automation, and core infrastructure for third-party extensions. For example, many businesses use EIP systems such as Microsoft SharePoint, provided by Microsoft Corporation of Redmond, Wash.; SAP NetWeaver, provided by SAP AG of Weinheim, Germany; Sun Java System Portal Server, provided by Oracle Corporation or Redwood City, Calif.; and the like.

Using native APIs such as those described above, it is often possible for developers to create custom forms and/or program custom clients to enable users to perform specific transactions with the ERP system. And using facilities provided by an EIP system, it is often possible for developers to enable users to perform such ERP transactions as part of an automated workflow.

However, it can be difficult and/or expensive to have developers implement custom interfaces for interacting with an ERP system via a native-API, even an API that is exposed via a web service. And it can also be difficult and/or expensive to have developers integrate such custom interfaces into an automated workflow. Consequently, many businesses must maintain an expensive information technology department and/or use expensive outside consultants to facilitate custom ERP interface development and workflow integration.

BRIEF DESCRIPTION OF THE DRAWINGS

FIG. 8 illustrates a portion of an automatically-generated description of a dynamic web service corresponding to an exemplary transaction in accordance with one embodiment.

FIG. 9 illustrates a forms authoring tool automatically generating a form according to an exemplary dynamic web service description in accordance with one embodiment.

DESCRIPTION

Figure 1:
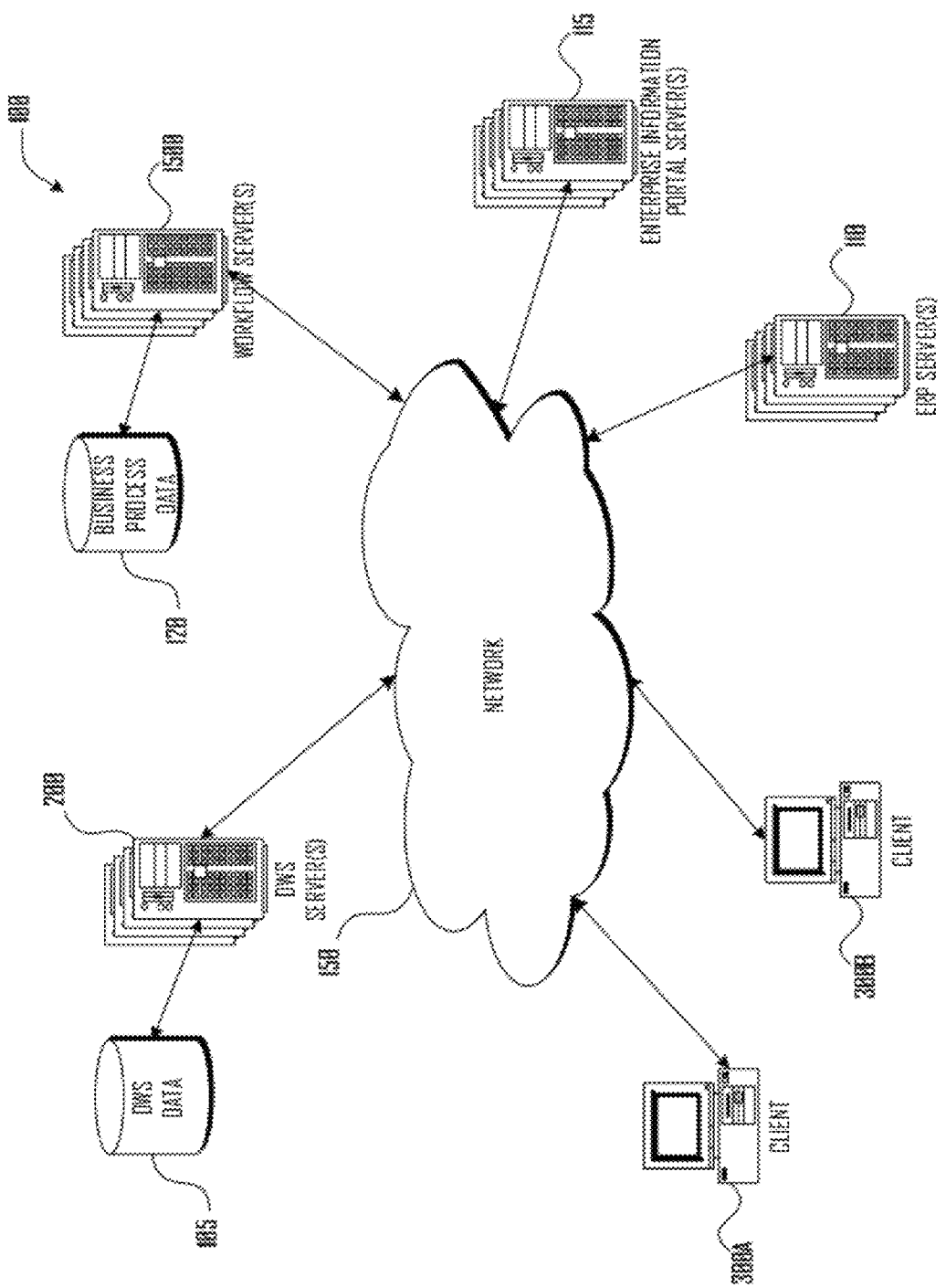
FIG. 1 illustrates an exemplary ERP system in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

According to various embodiments, as described below, a Dynamic Web Service ("DWS") server may facilitate custom Enterprise interface development with little or no developer input by dynamically creating a web service for performing a particular transaction, according to a transaction map created by "recording" a transaction between an ERP client and an ERP server.

FIG. 1 illustrates an exemplary enterprise system 100 in which client devices 300A-B, one or more DWS Server(s) 200, ERP Server(s) 110, Workflow Server(s) 1500, and Enterprise Information Server(s) 115 are connected to a network 150. In some embodiments, ERP Server 110 may further comprise an application server (not shown), and/or ERP Server 110 may further include the functionality of an application server. DWS Server 200 is also connected to a DWS data store 105, and Workflow Server 1500 is connected to business process data store 120. In some embodiments, DWS Server 200 may communicate with DWS data store 105 via network 150, a storage area network ("SAN"), a high speed serial bus, and/or via other suitable communication technology.

In various embodiments, network 150 may include the Internet, a local area network ("LAN"), a wide area network ("WAN"), and/or other data network. In other embodiments, some or all of DWS Server 200, ERP Server 110, Workflow Server(s) 1500, and/or Enterprise Information Server(s) 115 may communicate with one another via a channel other than network 150. For example, some or all of DWS Server 200, ERP Server 110, Workflow Server(s) 1500, and/or Enterprise Information Server(s) 115 may be connected via a SAN, a high speed serial bus, and/or via other suitable communication technology. In many embodiments, there may be additional client devices 300. In some embodiments, DWS Server 200, ERP Server 110, Workflow Server(s) 1500, and/or Enterprise Information Server(s) 115 may communicate with one another via a private network, a secure network, and/or a secure portion of network 150.

Figure 2:
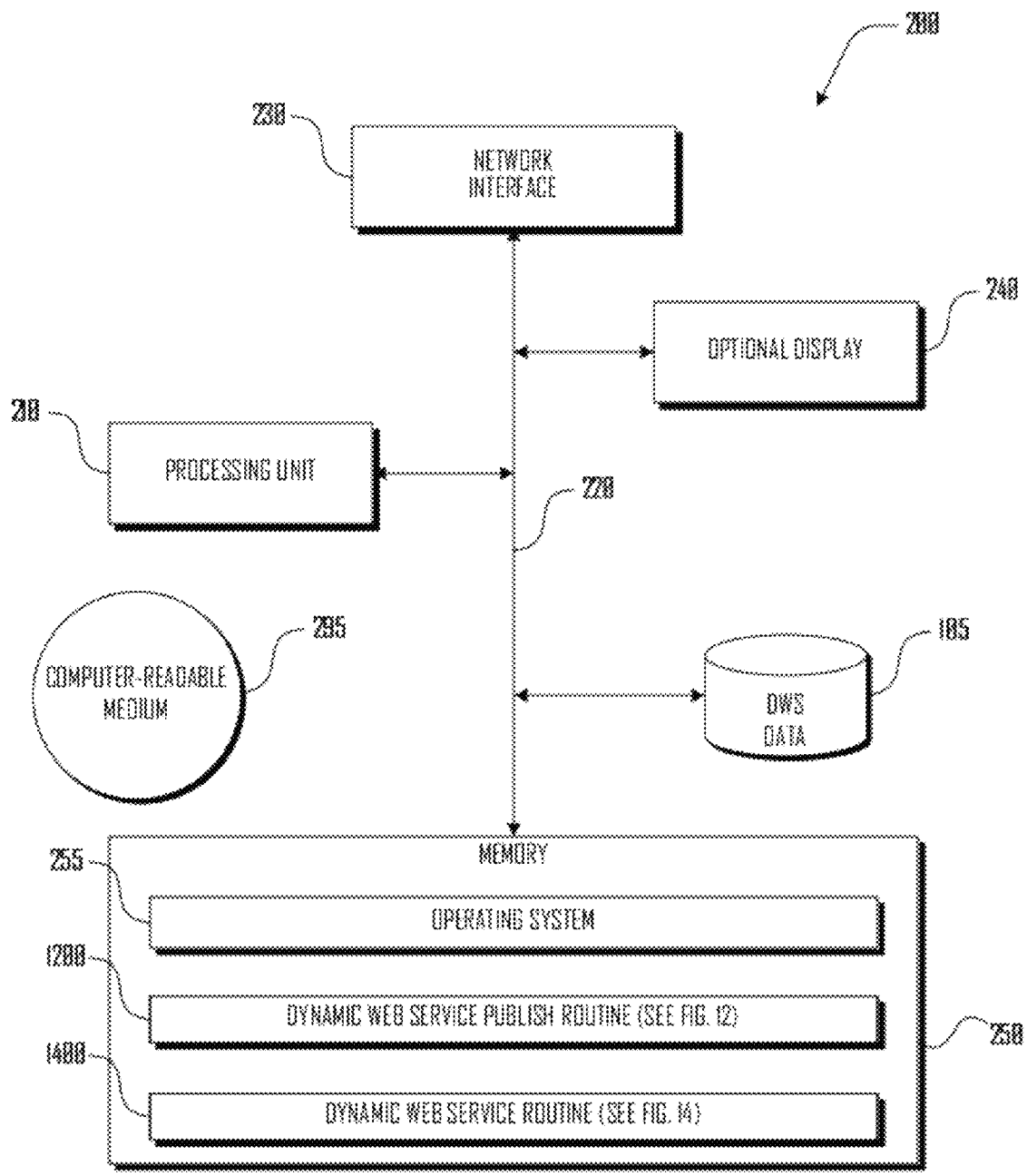
FIG. 2 illustrates several components of an exemplary DWS Server in accordance with one embodiment.

FIG. 2 illustrates several components of an exemplary DWS Server 200. In some embodiments, DWS Server 200 may include many more components than those shown in FIG. 2. However, it is not necessary that all of these generally conventional components be shown in order to disclose an illustrative embodiment. As shown in FIG. 2, the DWS Server 200 includes a network interface 230 for connecting to the network 150.

The DWS Server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for dynamic web service publish routine 1200 and dynamic web service routine 1400. In addition, the memory 250 also stores an operating system 255. These software components may be loaded from a non-transient computer readable storage medium 295 into memory 250 of the DWS Server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a non-transient computer readable storage medium 295.

DWS Server 200 also communicates via bus 220 with DWS data store 105. In various embodiments, bus 220 may comprise a storage area network ("SAN"), a high speed serial bus, and/or via other suitable communication technology. In some embodiments, DWS Server 200 may communicate with DWS data store 105 via network interface 230.

Although an exemplary DWS Server 200 has been described that generally conforms to conventional general purpose computing devices, an DWS Server 200 may be any of a great number of devices capable of communicating with the network 150 and/or ERP Server 110, for example, a personal computer, a game console, a set-top box, a handheld computer, a cell phone, or any other device that is capable of providing web services and communicating via a native-API with ERP Server 110.

Figure 3:
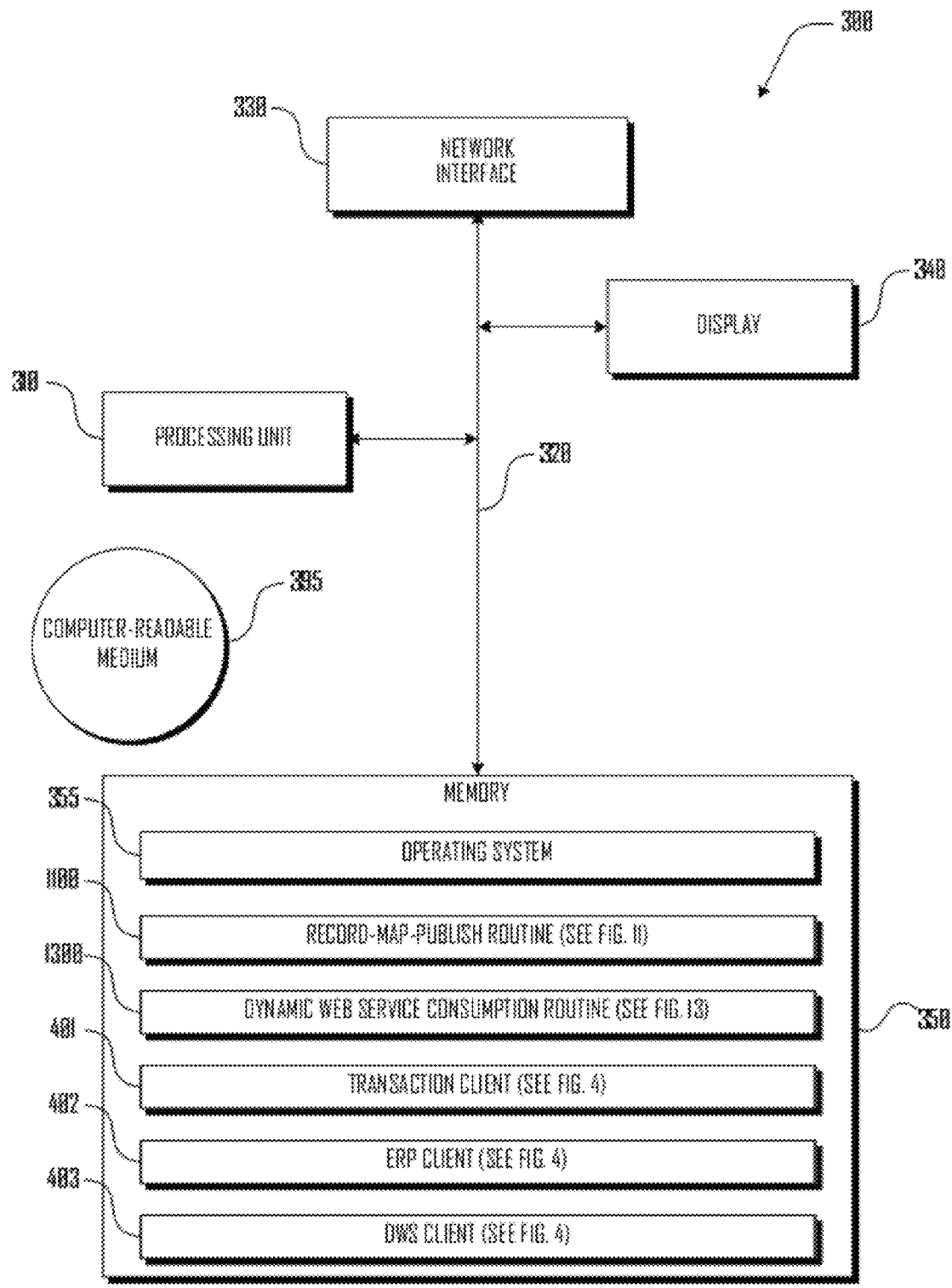
FIG. 3 illustrates several components of an exemplary Client Device in accordance with one embodiment.

FIG. 3 illustrates several components of an exemplary Client Device 300. In some embodiments, Client Device 300 may include many more components than those shown in FIG. 3. However, it is not necessary that all of these generally conventional components be shown in order to disclose an illustrative embodiment. As shown in FIG. 3, the Client Device 300 includes a network interface 330 for connecting to the network 150.

The Client Device 300 also includes a processing unit 310, a memory 350, and a display 340, all interconnected along with the network interface 330 via a bus 320. The memory 350 generally comprises a random access memory ("RAM"), a read only memory ("ROM"), and a permanent mass storage device, such as a disk drive. The memory 350 stores program code for record-map-publish routine 1100 and dynamic web service consumption routine 1300. In addition, the memory 350 also stores an operating system 355, as well as an ERP client 402, a DWS client 403, and a custom Transaction client 401 (see FIG. 4, discussed below). These software components may be loaded from a non-transient computer readable storage medium 395 into memory 350 of the Client Device 300 using a drive mechanism (not shown) associated with a non-transient computer readable storage medium 395, such as a floppy disc, tape, DVD/CD-ROM drive, memory card, or the like. In some embodiments, software components may also be loaded via the network interface 330, rather than via a non-transient computer readable storage medium 395.

Although an exemplary Client Device 300 has been described that generally conforms to conventional general purpose computing devices, an Client Device 300 may be any of a great number of devices capable of communicating with the network 150 and/or ERP Server 110, for example, a personal computer, a game console, a set-top box, a handheld computer, a cell phone, or any other device that is capable of accessing a accessing web services.

Figure 4:
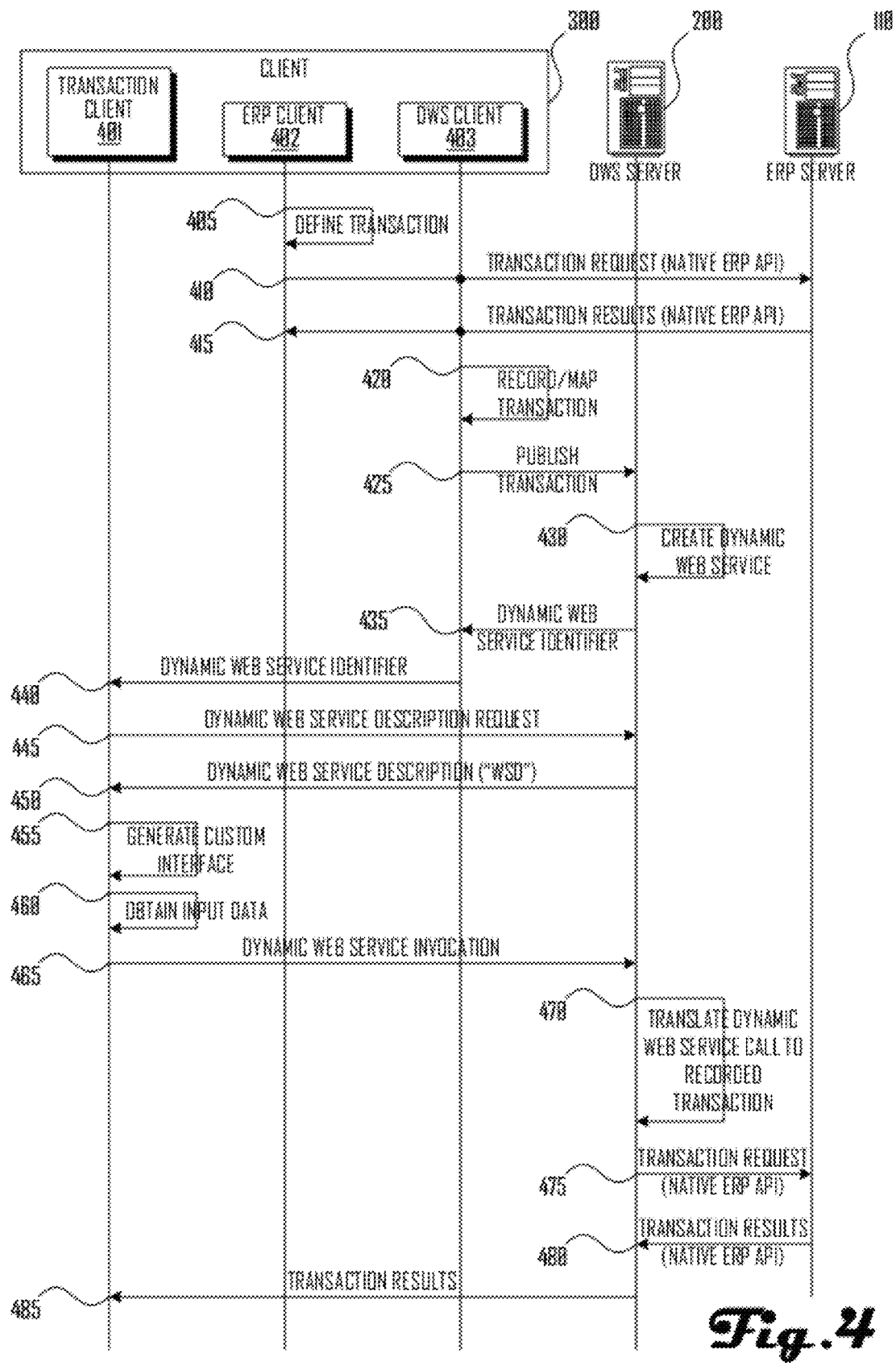
FIG. 4 illustrates an exemplary series of communications between Client, DWS Server, and ERP Server, in accordance with one embodiment.

FIG. 4 illustrates an exemplary series of communications between Client 300, DWS Server 200, and ERP Server 110, in accordance with one embodiment. In one embodiment, three software processes on Client 300 are involved: an ERP client 402, a DWS client 403, and a custom Transaction client 401. Beginning the illustrated sequence of operations, a user defines a transaction 405 using ERP client 402.

Figure 5:
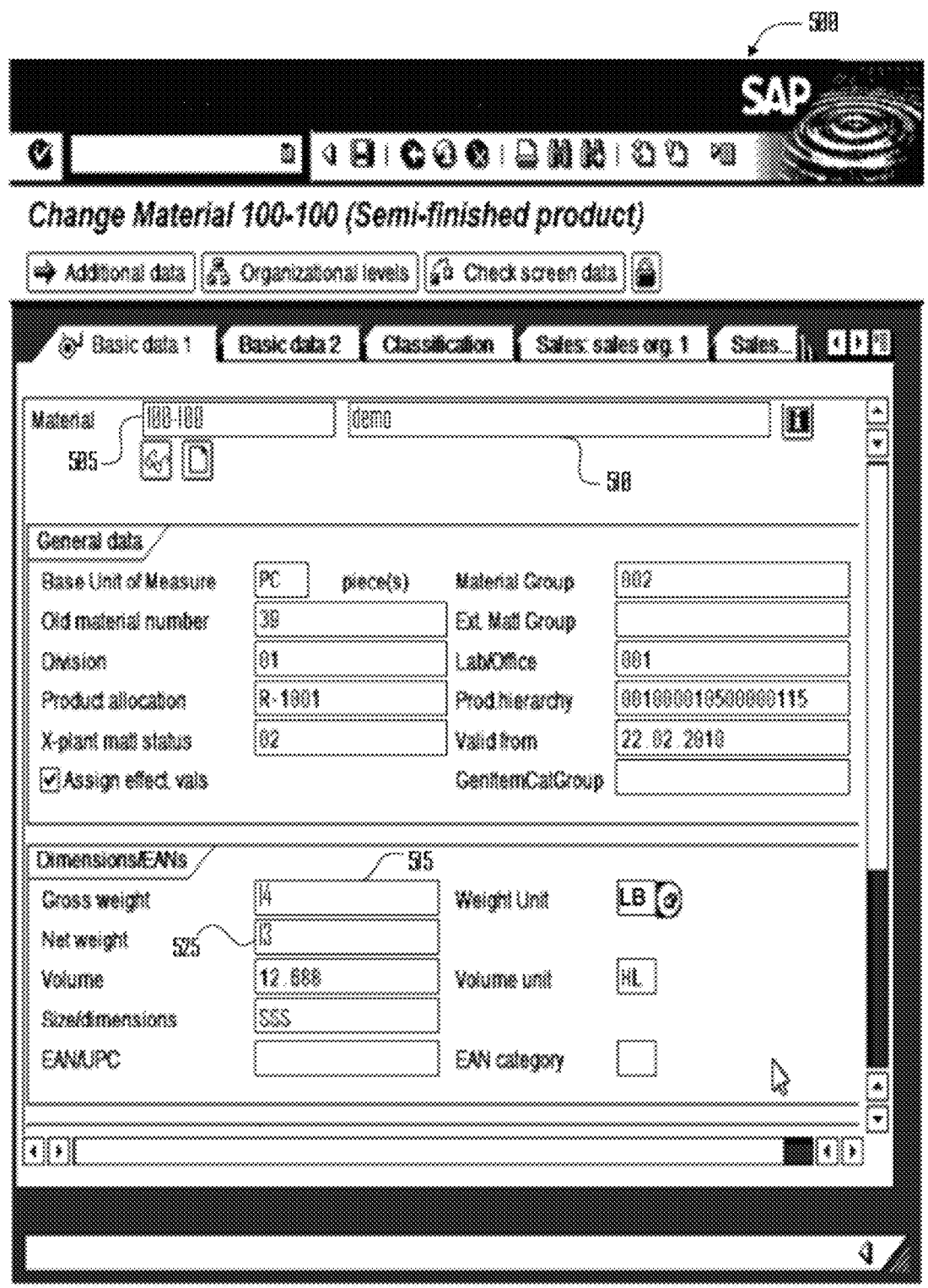
FIG. 5 illustrates an exemplary transaction in an ERP client process in accordance with one embodiment.

For example, as illustrated in FIG. 5, a user may in one embodiment define and perform a transaction using an SAP client, such as SAPgui 500. In the exemplary transaction illustrated in FIG. 5, the user is updating SAP data using a Material Number field 505, a Material Description field 510, a Gross Weight field 515, and a Net Weight field 525. Although the exemplary transaction illustrated herein uses SAP's ERP system, in other embodiments, equivalent procedures may be used to implement equivalent functionality in other ERP systems.

Referring again to FIG. 4, once the transaction is defined, ERP client 402 performs the transaction, sending one or more transaction requests 410 to ERP Server 110 using a native API provided by the ERP Server 110. In response, ERP Server 110 returns 415 one or more transaction results (e.g., a list of updated fields, status message(s), log data, responsive data, and the like). For example, in one embodiment, ERP client 402 (e.g., SAPgui) communicates with ERP Server 110 (e.g., an SAP server) via one or more RFCs. In other embodiments, ERP Server 110 may expose a native API as a web service, in which case, ERP client 402 may communicate with ERP Server 110 via SOAP messages, XML messages/data, JSON data, or the like.

As the user defines 405 and performs 410 the transaction, DWS client 403 monitors the user's activities in ERP client 402 and/or monitors the ERP client's communications with ERP Server 110. Using data thereby collected, DWS client 403 records and maps 420 the transaction that was defined 405 and performed 410 in ERP client 402.

Figure 6:
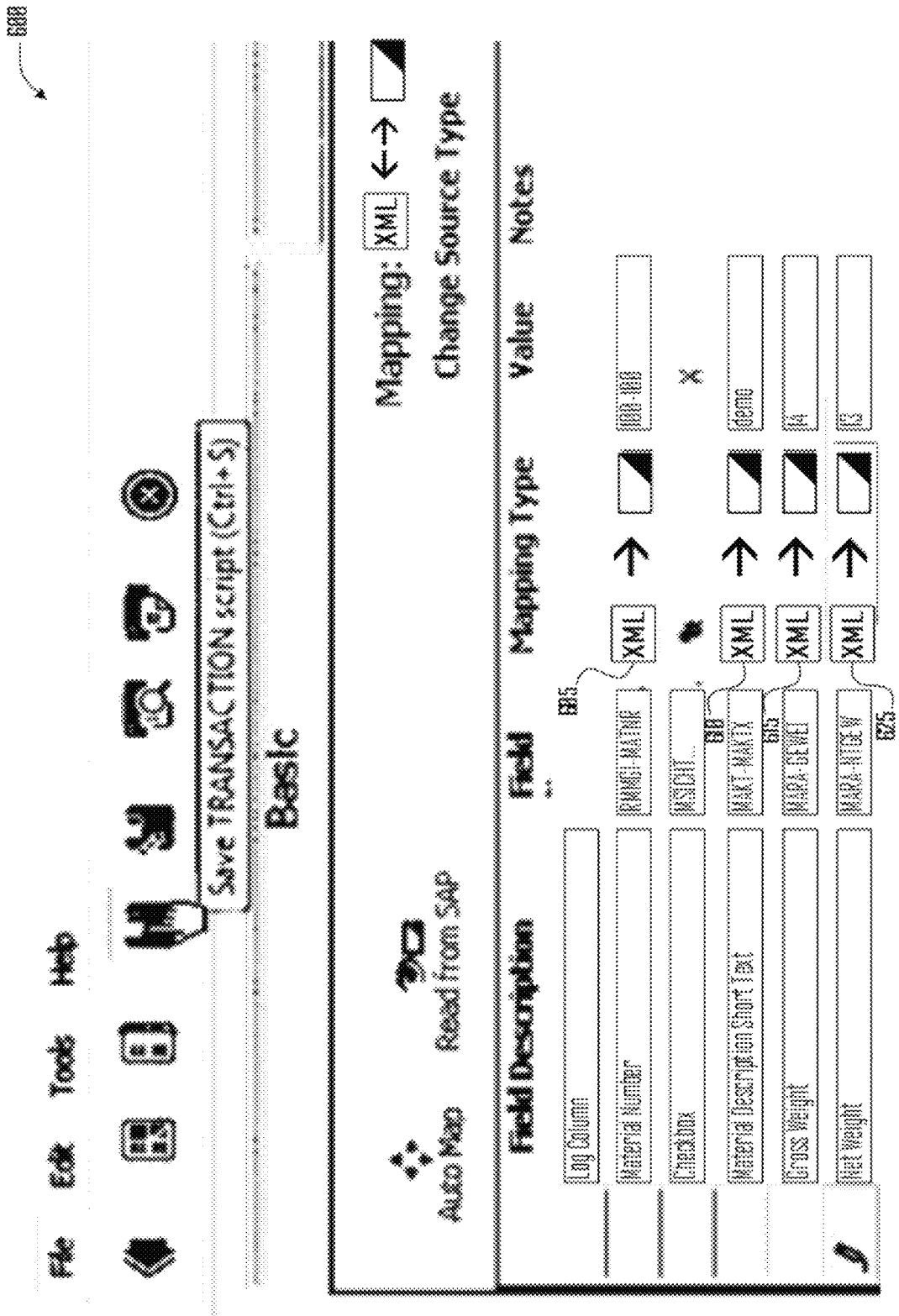
FIG. 6 illustrates an exemplary transaction recorded in a DWS client in accordance with one embodiment.

For example, as illustrated in FIG. 6, in one embodiment, a DWS client such as transactionSHUTTLE 600, provided by Winshuttle, Inc. of Bothell, Wash. (the assignee of this application), may record and map the transaction. As illustrated in FIG. 6, transactionSHUTTLE 600 has recorded the exemplary transaction (as defined according to FIG. 5), and the user has mapped the Material Number field 605, the Material Description field 610, the Gross Weight field 615, and the Net Weight field 625 to XML sources, indicating that when the recorded transaction is re-played at a later time, values for these fields will be provided by XML data. In other embodiments, one or more of the fields may be mapped to an alternate data source, such as a spreadsheet column or database field.

Referring again to FIG. 4, once the transaction is recorded and mapped 420, DWS client 403 sends a publish transaction request 425 to DWS Server 200. In response, DWS Server 200 creates a dynamic web service 430 for the recorded transaction, including automatically generating a description of the dynamic web service, and returns an identifier 435 for the created dynamic web service.

Figure 7:
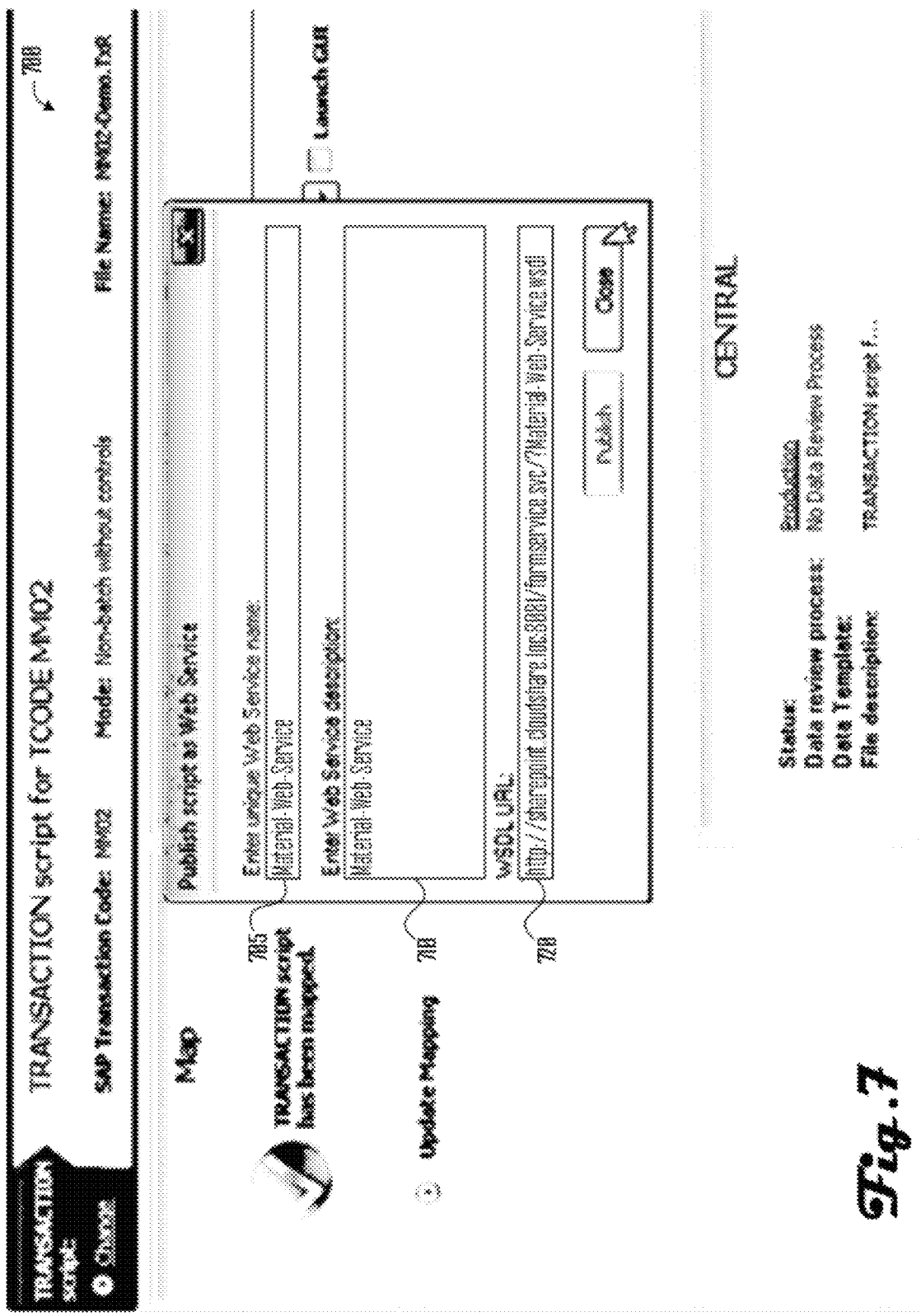
FIG. 7 illustrates an exemplary transaction published from a DWS client in accordance with one embodiment.

For example, as illustrated in FIG. 7, transactionSHUTTLE 700 has requested that the exemplary transaction (as defined according to FIG. 5) be published as a dynamic web service. The publication request includes a unique method name 705 for the dynamic web service, a web service description 710, and a publish-request URL 715 at the DWS Server 200. Also illustrated is the dynamic web service identifier 720 (here, an URL for a WSDL XML schema corresponding to the newly-created dynamic web service) that was returned by DWS Server 200.

Figure 8:
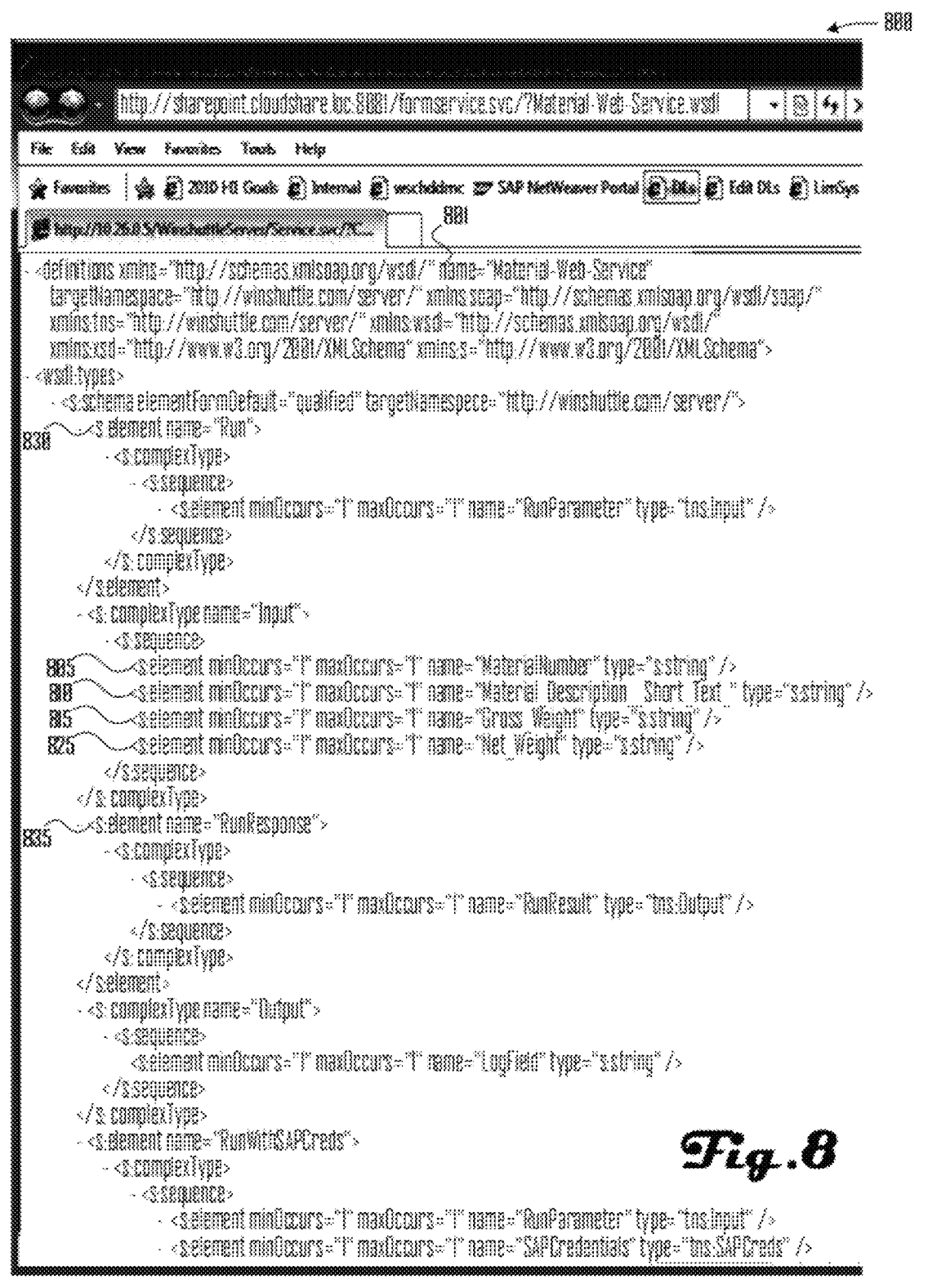

FIG. 8 illustrates a portion of an automatically-generated description (here, a portion of a WSDL XML schema) corresponding to the exemplary transaction (as defined according to FIG. 5). The exemplary WSDL XML schema includes a unique method name 801 for the dynamic web service, as well as elements 830, 835 for running the recorded transaction and for receiving a response from the DWS Server 200. The illustrated element 830 for running the recorded transaction also includes a series of elements for providing input data to the recorded transaction, including a Material Number element 805, a Material Description element 810, a Gross Weight element 815, and a Net Weight element 825.

Referring again to FIG. 4, once the transaction has been published as a dynamic web service, DWS client 403 provides the dynamic web service identifier 440 to a custom Transaction client 401, which uses the identifier to request a description of the identified dynamic web service 445 from DWS Server 200. DWS Server 200 returns the requested description 450. Using the received dynamic web service description, Transaction client 401 generates a custom interface 455 for providing input data for the recorded transaction.

Figure 9:
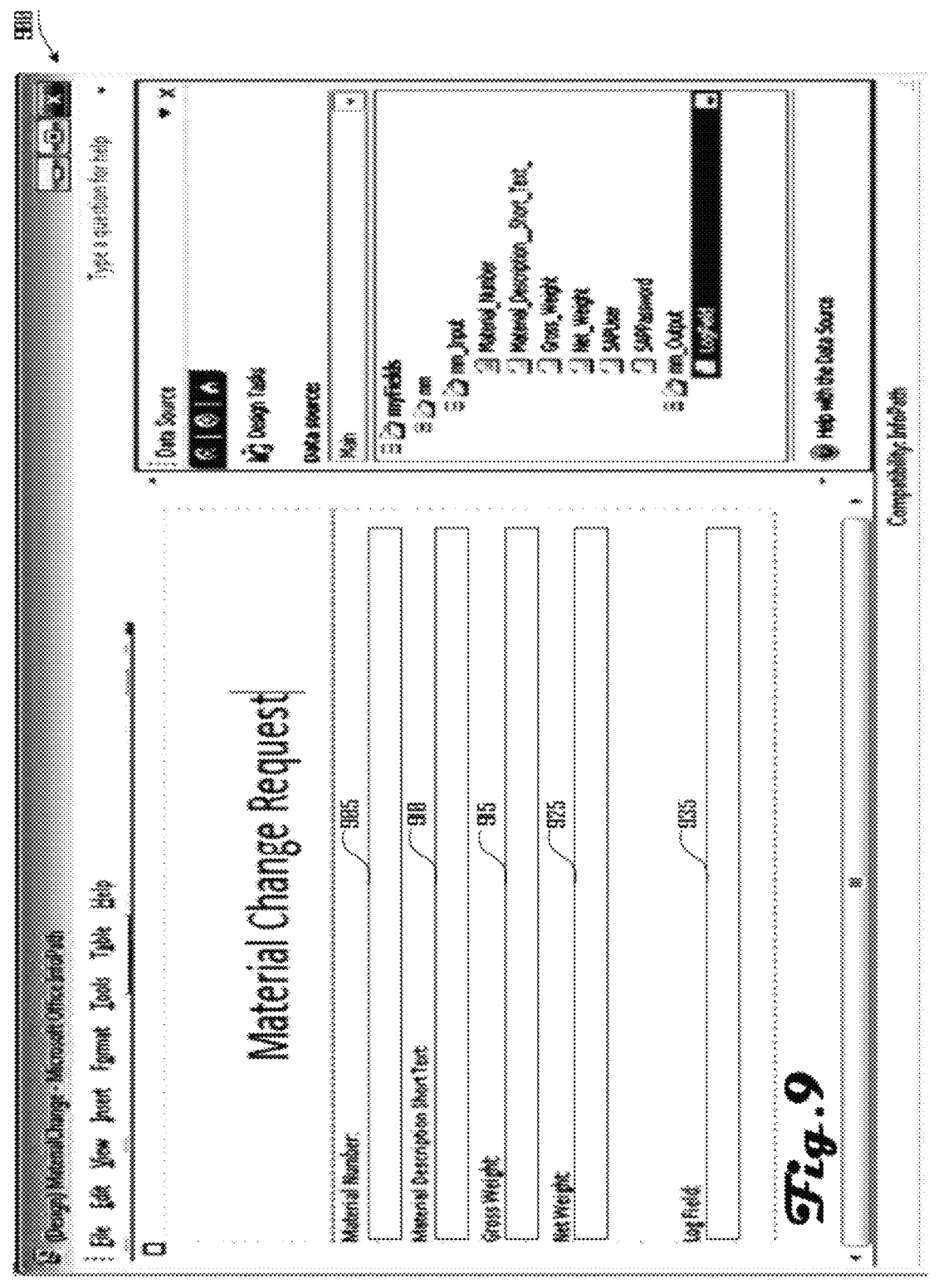

For example, as illustrated in FIG. 9, a forms-authoring tool such as Microsoft InfoPath forms, provided by Microsoft Corporation of Redmond, Wash., can parse the WSDL XML schema describing the exemplary recorded transaction (as defined according to FIG. 5) and generate a form having fields linked to the appropriate inputs used by the dynamic web service. For example, the form illustrated in FIG. 9 has fields for the Material Number field 905, the Material Description field 910, the Gross Weight field 915, and the Net Weight field 925. In some embodiments, a form such as that illustrated in FIG. 9 may also have a control (not shown) for performing the transaction and field 935 for displaying output from performing the transaction (if any). In many embodiments, a user may further customize the automatically-generated form, such as by providing user-friendly names, rearranging and/or resizing form fields, and the like.

In other embodiments, other forms-authoring tools may be employed to at least partially automatically generate a form having fields linked to the appropriate inputs used by the dynamic web service. For example, in various embodiments, a form may be generated using a tool such as LiveCycle Designer, provided by Adobe Systems Incorporated of Mountain View, Calif.; a Windows Forms application, such as Microsoft Visual Studio, also provided by Microsoft Corporation of Redmond, Wash.; a mobile forms builder, such as Canvas, provided by Canvas Solutions, Inc. of Herndon, Va.; and/or a web-form builder, such as Oracle Application Express (APEX), provided by Oracle Corporation of Redwood Shores, Calif.

Referring again to FIG. 4, once the custom Transaction client 401 has generated a custom interface for providing input data for the recorded transaction, Transaction client 401 obtains input data from a user 460 and sends a dynamic web service invocation 465 to DWS Server 200. DWS Server 200 identifies the recorded transaction corresponding to the dynamic web service invocation, transforms 470 the dynamic web service invocation into one or more transaction requests, and sends the one or more transaction requests 475 to ERP Server 110 via a native ERP API. ERP Server 110 returns transaction results 480 (if any) via the native ERP API, and DWS Server 200 sends the transaction results 485 (if any) to Transaction client 401.

Figure 10:
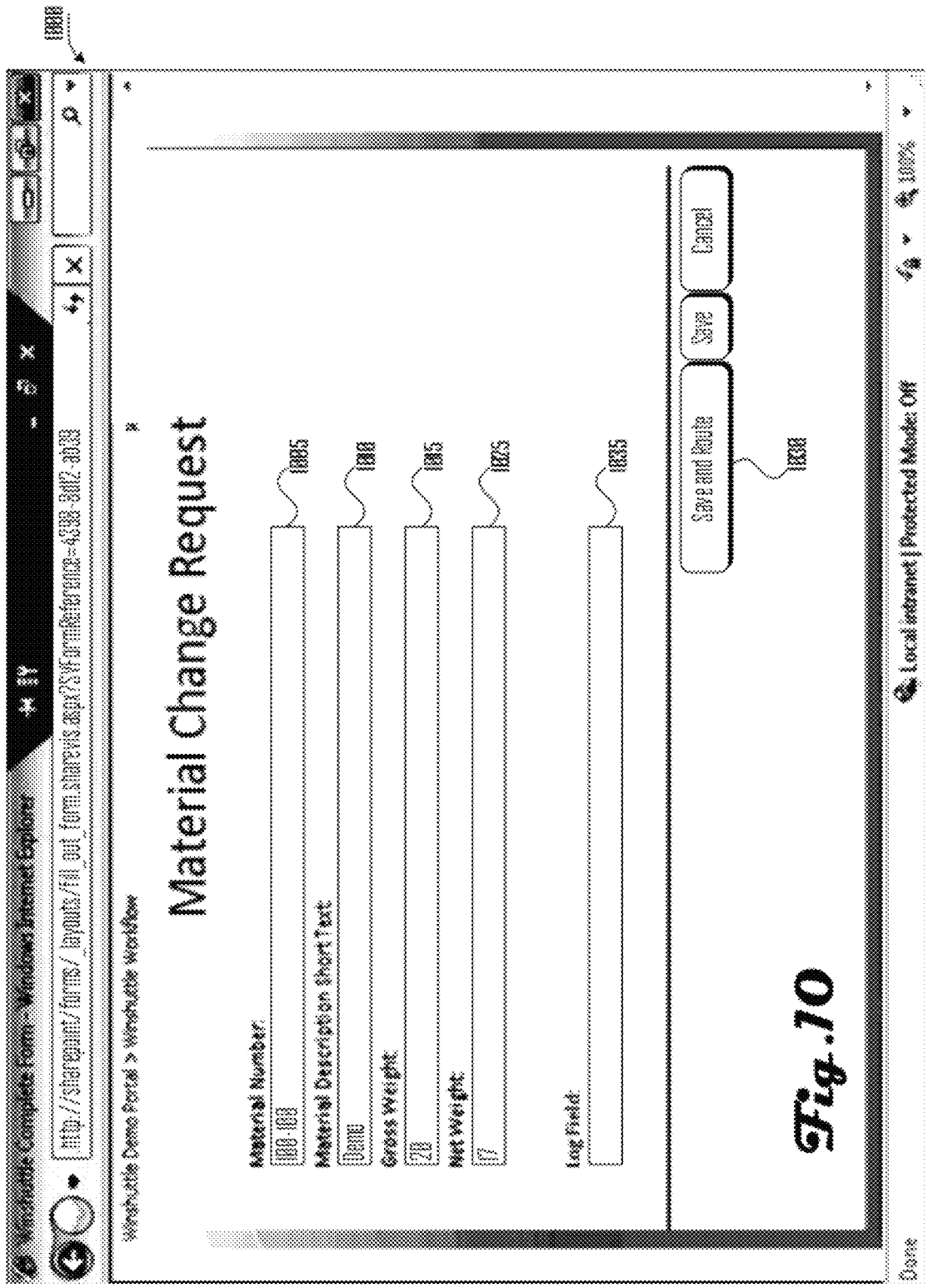
FIG. 10 illustrates a form presentation tool obtaining data in accordance with one embodiment.

For example, as illustrated in FIG. 10, a form presented via a web service can obtain data from a user for fields in a form 1000 automatically-generated as described herein. For example, as illustrated in FIG. 10, a user has filled in the form 1000, entering values for the Material Number field 1005, the Material Description field 1010, the Gross Weight field 1015, and the Net Weight field 1025. The user may invoke control 1030 to save the data for later processing. In other embodiments, form 1000 may include a control (not shown) for performing the transaction, and the form invoked the corresponding dynamic web service, sending appropriately-formatted XML data to DWS Server 200, which transformed the dynamic web service request into one or more native-API transactions with ERP Server 110. Transaction results (if any) are displayed in field 1035.

Although the exemplary Transaction client 401 is illustrated as a web-service form, in other embodiments, any client that supports web services can be used, including presentation tool such as Acrobat Reader or Acrobat Pro, provided by Adobe Systems Incorporated of Mountain View, Calif.; Microsoft InfoPath forms, provided by Microsoft Corporation of Redmond, Wash.; a Windows Forms application, such as Microsoft Visual Studio, also provided by Microsoft Corporation of Redmond, Wash.; and/or a HyperText Markup Language, Adobe Flash, or other web-based front-end that can be called from a web-enabled computer or mobile device. In some embodiments, a Transaction client 401 may be deployed on a mobile device, such as a mobile phone, PDA, tablet, game console, or the like, which may or may not be the same device on which the transaction was originally recorded.

Figure 11:
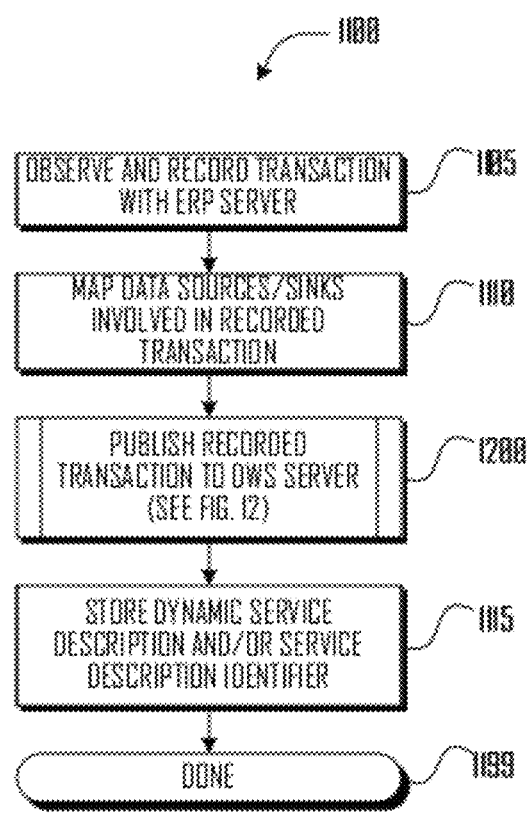
FIG. 11 illustrates a record-map-publish routine in accordance with one embodiment.

FIG. 11 illustrates a record-map-publish routine 1100 in accordance with one embodiment. In some embodiments, routine 1100 may be performed by Client 300 in communication with DWS Server 200. In block 1105, routine 1100 observes and records a native-ERP-API transaction between an ERP client 402 and ERP Server 110. For example, in one embodiment, a DWS client process 403 (e.g., transaction-SHUTTLE) may observe and record a transaction between an ERP client 402 (e.g., SAPGui) and ERP Server 110 (e.g., SAP server), for example, via an SAP GUI scripting interface. In some embodiments, routine 1100 may also monitor network communications between an ERP client 402 and ERP Server 110.

In block 1110, routine 1100 maps data sources and/or data sinks (if any) involved in the recorded transaction. For example, in some embodiments, ERP Server 110 may return a list of fields involved in the transaction or other metadata about the transaction. In some embodiments, routine 1100 may observe the user interacting with particular fields in the ERP client process 402. In some embodiments, routine 1100 may solicit mapping information from a user, accepting user input to create mappings between particular input and/or output fields involved in the transaction and external data sources and/or data sinks (e.g., XML data, spreadsheet data, database data, and the like). In some embodiments, one or more of the fields involved in the transaction may not be mapped to an external source, but the data provided during the original transaction recording is treated as static data for that field.

In called-routine block 1200, routine 1100 calls a remote publish routine 1200 (see FIG. 12, discussed below) at DWS Server 200 to have the recorded and mapped transaction published as a dynamic web service. For example, in one embodiment, DWS Server 200 may provide a static "Publish" web service that routine 1100 can use to have the recorded/ mapped transaction published as a dynamic web service.

In some embodiments, called-routine 1200 returns a dynamic service description and/or a dynamic service description identifier (e.g., a WSDL XML schema describing the dynamic web service and/or an URL for such a WSDL file), and in block 1115, routine 1100 stores (at least transiently) the dynamic service description and/or a dynamic service description identifier. Routine 1100 ends in block 1199.

Figure 12:
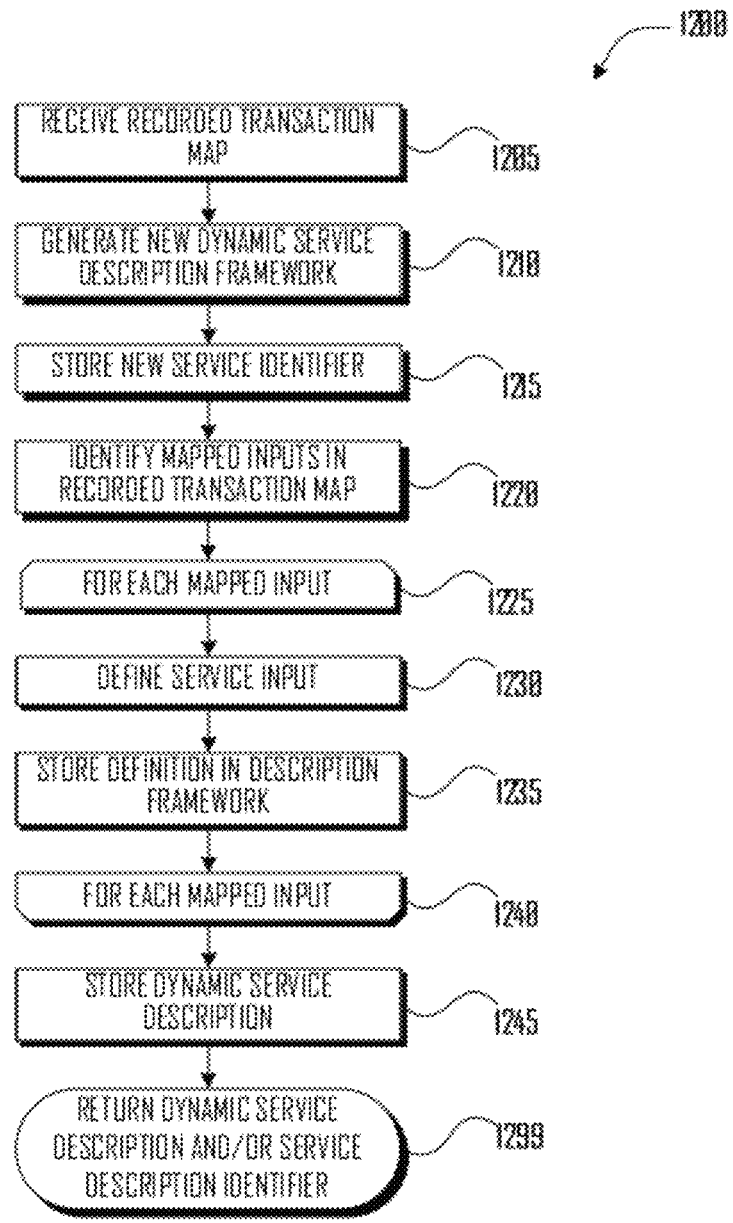
FIG. 12 illustrates a dynamic web service publish routine in accordance with one embodiment.

FIG. 12 illustrates a dynamic web service publish routine 1200. In some embodiments, routine 1200 may be performed by DWS Server 200. In block 1205, routine 1200 receives a recorded transaction map describing a recorded transaction between an ERP client 402 and ERP Server 110 and mapping one or more fields involved in the transaction to one or more external data sources (e.g., to XML data). For example, in one embodiment, routine 1200 receives a "TxR" file, such as those created by the transactionSHUTTLE software application.

Using the recorded transaction map, in block 1210, routine 1200 automatically generates a description framework for a new dynamic web service corresponding to the recorded transaction. For example, in one embodiment, routine 1200 generates a framework for a WSDL XML schema such as that partially illustrated in FIG. 8, discussed above. In some embodiments, routine 1200 may store the description framework in DWS data store 105. In block 1215, routine 1200 determines (if need be) and stores a new service identifier for the dynamic web service that will correspond to the recorded transaction map. In some embodiments, routine 1200 may store the service identifier in DWS data store 105. For example, for the exemplary transaction illustrated in FIGS. 5-8, discussed above, routine 1200 may store the unique dynamic web service identifier, "ChangeMaterial" (see field 705, above).

In block 1220, routine 1200 identifies one or more input fields that have been mapped to one or more external data sources. Beginning in block 1225, routine 1200 processes each identified mapped input field. In block 1230, routine 1200 defines an input for the dynamic web service corresponding to the current mapped input field. In block 1235, routine 1200 stores the defined input in the service description framework. In block 1240, routine 1200 cycles back to block 1225 to process the next mapped input field (if any).

For example, for the exemplary transaction illustrated in FIGS. 5-8, discussed above, routine 1200 may identify an input field mapped to a "Material Number" data source (e.g., field 605 in FIG. 6) and generate and store a corresponding input element in a WSDL XML schema (e.g., element 805 in FIG. 8). Similarly, for the exemplary transaction, routine 1200 may further identify mapped input fields 610-25 (as illustrated in FIG. 6) and generate elements 810-25 (as illustrated in FIG. 8).

Having generated and stored an identifier and description for a new dynamic web service corresponding to a recorded transaction map, in block 1245, routine 1200 stores completed dynamic web service description, for example, in DWS data store 105. In some embodiments, routine 1200 may also obtain and store additional data and/or files, such as ERP authentication credentials (see, e.g., FIG. 7 field 710).

Routine 1200 ends in bock 1299, making available at least one of the identifier and the description, e.g., to the calling routine (which may be a remote process on a client device, e.g., Client 300). For example, in one embodiment, routine 1200 may return an URL containing the unique dynamic web service identifier. In one embodiment, this URL simply returns the dynamic web service description stored in block 1245 (e.g., a WSDL XML Schema) to a requestor. For example, if the unique dynamic web service identifier is "CreateMaterial," then in one embodiment, the returned URL may take the following form: "http://abc.com/winshuttleserver/Service.svc/CreateMaterial?WSDL". Since the dynamic web service identifier is unique, this URL is also unique and specific to the published service.

Figure 13:
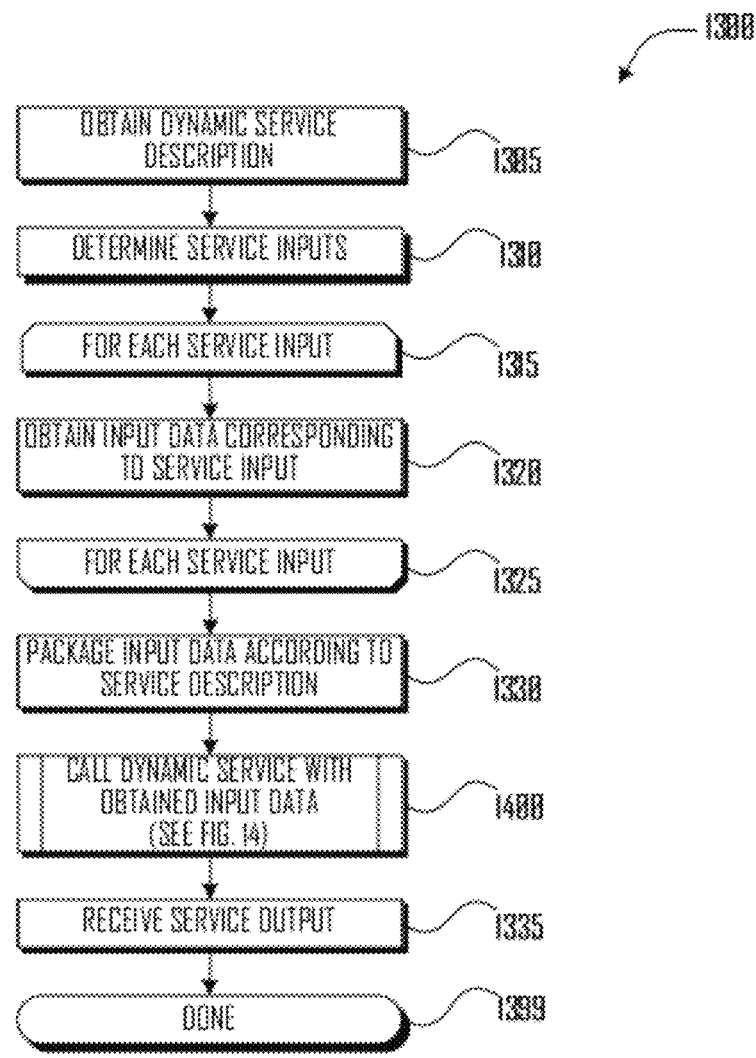
FIG. 13 illustrates a dynamic web service consumption routine in accordance with one embodiment.

FIG. 13 illustrates a dynamic web service consumption routine 1300 in accordance with one embodiment. In some embodiments, routine 1100 may be performed by Client 300 (more specifically, by a Transaction client process 401 on Client 300) in communication with DWS Server 200. In block 1305, routine 1300 obtains a description for a dynamic web service corresponding to a recorded transaction with ERP Server 110. For example, in some embodiments, routine 1300 may obtain an URL (e.g., from DWS client 403) from which routine 1300 requests and receives a service description. In other embodiments, routine 1300 may obtain such an URL and/or service description from a local process (e.g., DWS client 403) or file.

In block 1310, routine 1300 determines one or more service inputs mapped to one or more external data sources in the dynamic service description. Beginning in block 1315, routine 1300 processes each identified service input. In block 1320, routine 1300 obtains input data corresponding to the current service input. In block 1325, routine 1300 cycles back to block 1315 to process the next service input (if any).

For example, for the exemplary transaction illustrated in FIGS. 8-10, discussed above, routine 1300 may identify a service input mapped to a "Material Number" data source (e.g., element 805 in FIG. 8) obtain corresponding input from a user (e.g., via form field 1005 in FIG. 10). Similarly, for the exemplary transaction, routine 1300 may further identify service inputs 810-25 (as illustrated in FIG. 8) and obtain inputs via corresponding form fields 1010-25 (as illustrated in FIG. 10).

In block 1330, routine 1300 packages the obtained input data according to the obtained dynamic service description. For example, in one embodiment, routine 1300 packages the input data into XML according to the WSDL service description. In some embodiments, routine 1300 packages the input data into an XML SOAP message according to the WSDL service description.

In called-routine block 1400 (see FIG. 14, discussed below), routine 1300 passes the packaged data to the dynamic web service corresponding to the obtained dynamic web service description. In some embodiments, called-routine 1400 is a remote process that routine 1300 invokes on DWS Server 200 by calling a static "Run" web service, passing in as parameters a dynamic web service identifier and the corresponding packaged data.

In block 1335, routine 1300 receives output from the invoked dynamic web service (if any). For example, in some embodiments, the dynamic web service may return log information, and/or requested data structures. Routine 1300 ends in block 1399.

Figure 14:
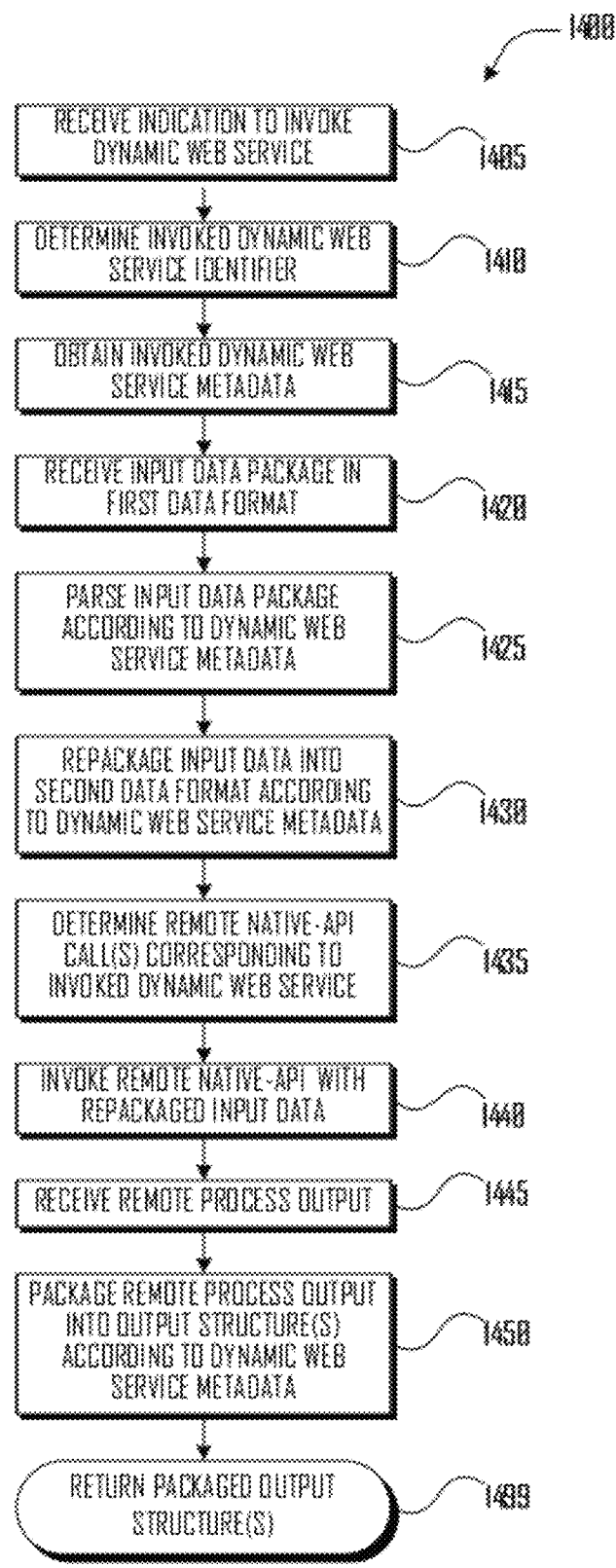
FIG. 14 illustrates a dynamic web service routine in accordance with one embodiment.

FIG. 14 illustrates a dynamic web service routine 1400 in accordance with one embodiment. In some embodiments, routine 1100 may be performed by DWS Server 200. In block 1405, routine 1400 receives an indication to invoke a dynamic web service. For example, in one embodiment, a static web service (e.g., a "Run" web service) may be invoked with an indication of a dynamic web service to perform.

In block 1410, routine 1400 determines an identifier corresponding to the indicated dynamic web service. For example, in one embodiment, routine 1400 may determine a dynamic web service identifier passed in as a parameter to a static web service.

In block 1415, routine 1400 obtains metadata corresponding to the identified dynamic web service. For example, in one embodiment, routine 1400 obtains metadata from a metadata library in DWS data store 105. In some embodiments, the obtained metadata includes information from a recorded transaction map. In some embodiments, the obtained metadata may also include ERP authentication credentials.

In block 1420, routine 1400 obtains a package of input data in a first data format. For example, in one embodiment, routine 1400 obtains XML and/or SOAP data corresponding to one or more input fields.

In block 1425, routine 1400 parses the input data package according to the obtained dynamic web service metadata, and if necessary, in block 1430, routine 1400 repackages the input data into a second data format according to the dynamic web service metadata. For example, in one embodiment, routine 1400 repackages XML and/or SOAP data structures into one or more packages of data structured so as to comply with an RFC calling mechanism used to communicate via a native-API with ERP Server 110.

In block 1435, using the obtained dynamic web service metadata, routine 1400 determines one or more remote native-ERP-API calls corresponding to the invoked dynamic web service. For example, in one embodiment, routine 1400 may determine one or more RFC calls that were recorded between an ERP client 402 and ERP Server 110.

In block 1440, routine 1400 invokes the one or more remote native-ERP-API calls on ERP Server 110, using the repackaged input data in place of the input data originally provided in the recorded transaction. In some embodiments, routine 1400 may essentially "mimic" the behavior of the ERP client 402 from which the transaction was originally recorded, using RFC to invoke the ERP Server's native-ERP-API. In other embodiments, routine 1400 may use a native-ERP web service API to perform the recorded transaction with the newly provided input data.

In block 1445, routine 1400 receives output data from the remotely-invoked native-ERP-API calls (if any). In block 1450, routine 1400 packages the output data into one or more output structures (if any) identified in the dynamic web service metadata. In block 1499, routine 1400 ends, making available the packaged output structures (if any), e.g., to the calling remote process.

Figure 15:
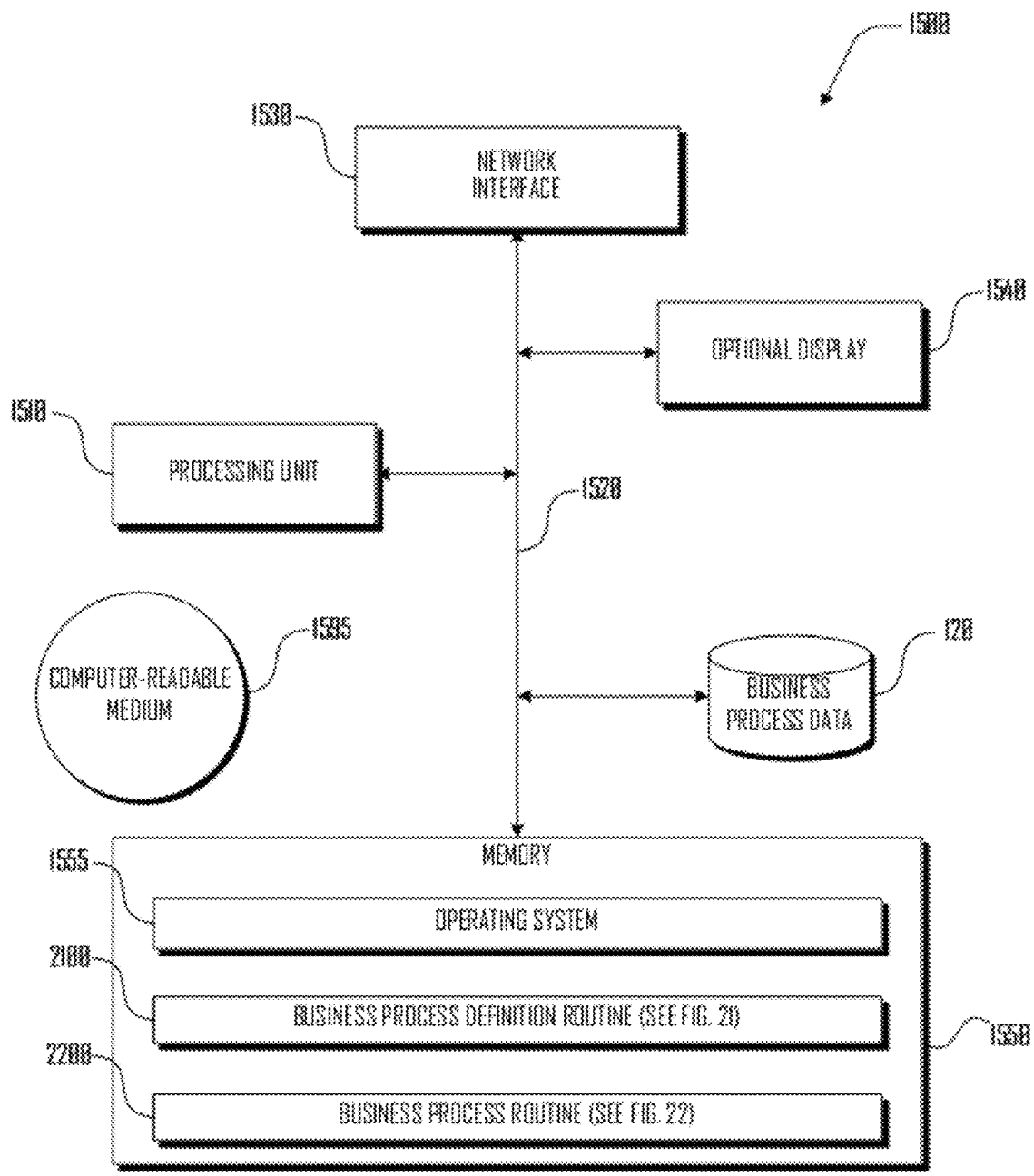
FIG. 15 illustrates several components of an exemplary Workflow Server in accordance with one embodiment.

FIG. 15 illustrates several components of an exemplary Workflow Server 1500. In some embodiments, Workflow Server 1500 may include many more components than those shown in FIG. 15. However, it is not necessary that all of these generally conventional components be shown in order to disclose an illustrative embodiment. As shown in FIG. 15, the Workflow Server 1500 includes a network interface 1530 for connecting to the network 150.

The Workflow Server 1500 also includes a processing unit 1510, a memory 1550, and an optional display 1540, all interconnected along with the network interface 1530 via a bus 1520. The memory 1550 generally comprises a random access memory ("RAM"), a read only memory ("ROM"), and a permanent mass storage device, such as a disk drive. The memory 1550 stores program code for a business process definition routine 2100 and business process routine 2200. In addition, the memory 1550 also stores an operating system 1555. These software components may be loaded from a non-transient computer readable storage medium 1595 into memory 1550 of the Workflow Server 1500 using a drive mechanism (not shown) associated with a non-transient computer readable storage medium 1595, such as a floppy disc, tape, DVD/CD-ROM drive, memory card, or the like. In some embodiments, software components may also be loaded via the network interface 1530, rather than via a non-transient computer readable storage medium 1595.

Workflow Server 1500 also communicates via bus 1520 with business process data store 120. In various embodiments, bus 1520 may comprise a storage area network ("SAN"), a high speed serial bus, and/or via other suitable communication technology. In some embodiments, Workflow Server 1500 may communicate with business process data store 120 via network interface 1530.

Although an exemplary Workflow Server 1500 has been described that generally conforms to conventional general purpose computing devices, an Workflow Server 1500 may be any of a great number of devices capable of communicating with the network 150, clients 300A-B, DWS server 200, enterprise information portal server 115, and/or ERP Server 110, for example, a personal computer, a game console, a set-top box, a handheld computer, a cell phone, or any other suitable device.

Figure 16:
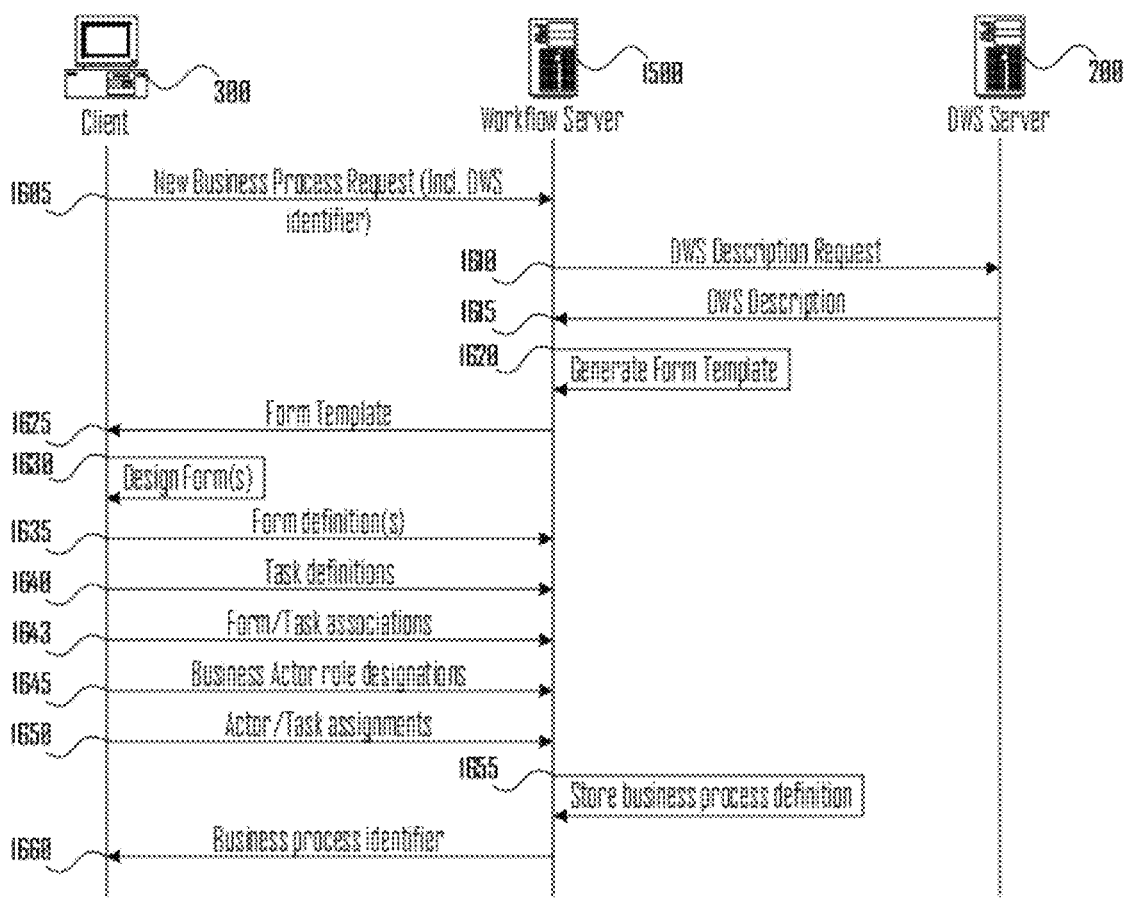
FIG. 16 illustrates an exemplary series of communications between Client, Workflow Server, and DWS Server, in accordance with one embodiment.

FIG. 16 illustrates an exemplary series of communications between Client 300, Workflow Server 1500, and DWS Server 200, in accordance with one embodiment in which Workflow Server 1500 obtains and stores a definition for a reusable business process that makes use of a dynamic web service provided by DWS Server 200.

The illustrated sequence begins with Client 300 sending to Workflow Server 1500 a request 1605 to create a new business process that will make use of a dynamic web service, the request 1605 including an identifier of that dynamic web service.

Using the dynamic web service identifier, Workflow Server 1500 sends to DWS Server 200 a request 1610 for a description of the identified dynamic web service. In return, DWS Server 200 sends to Workflow Server 1500 the requested dynamic web service description 1615 (e.g., a WSDL XML schema corresponding to the identified dynamic web service).

In some embodiments, each task in a workflow may be associated with a form for collecting, displaying, reviewing/approving, and/or submitting data associated with the task. Using the dynamic web service description, Workflow Server 1500 generates 1620 a form template configured to use inputs and/or outputs described in the dynamic web service description.

Figure 17:
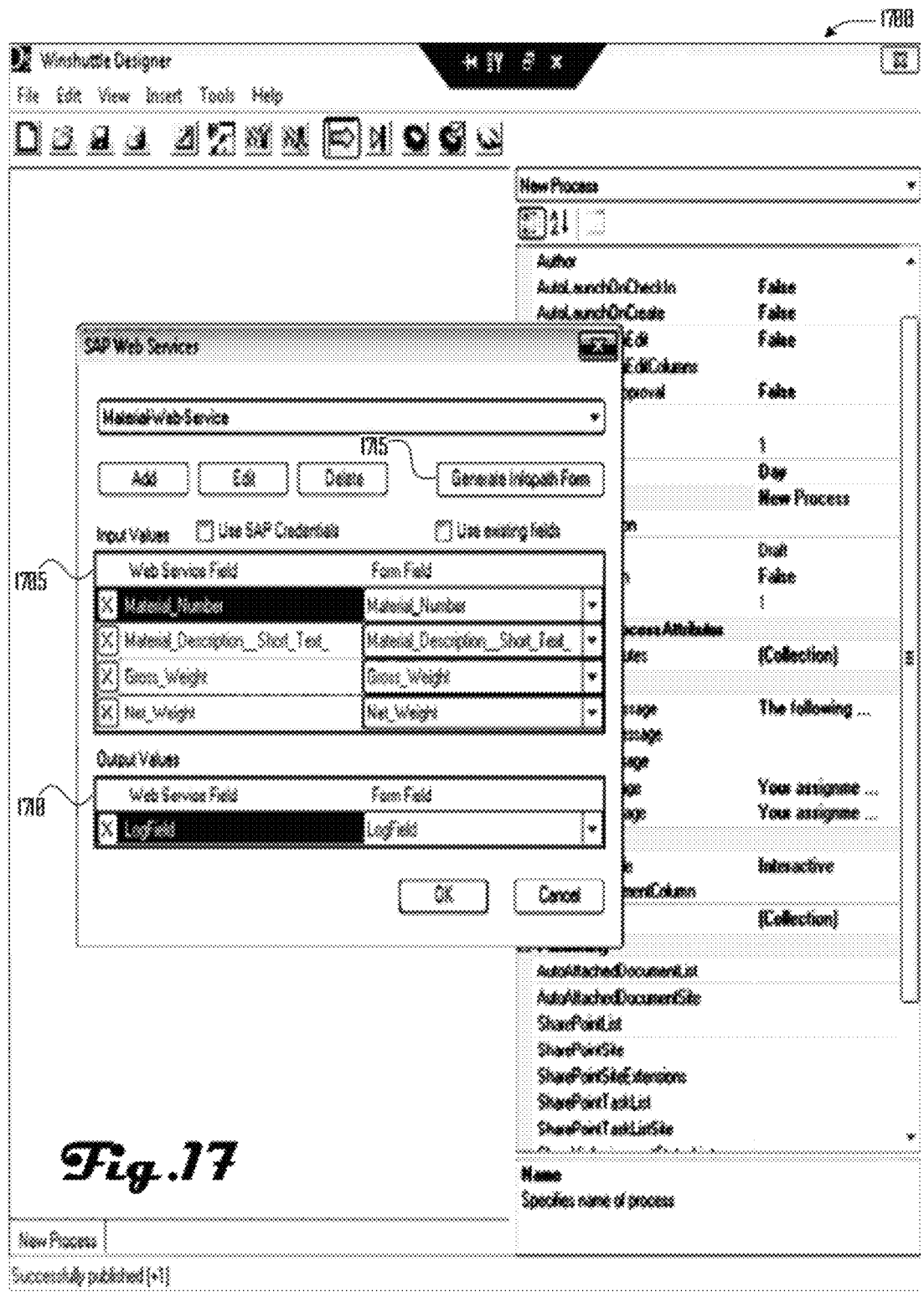
FIG. 17 illustrates a user interface such as may be employed by an exemplary workflow designer application, in accordance with one embodiment.

For example, FIG. 17 illustrates a user interface 1700 such as may be employed by an exemplary workflow designer application, in accordance with one embodiment. User interface 1700 includes a table 1705 indicating input fields (described in the dynamic web service description) and corresponding form input fields. User interface 1700 also includes a table 1710 indicating output fields (described in the dynamic web service description) and corresponding form output fields. User interface 1700 further includes a control 1715 for generating a form template (here, a blank form configured to use input and output fields indicated in tables 1705 and 1710).

Referring again to FIG. 16, Workflow Server 1500 sends to Client 300 a form template 1625 configured to use inputs and/or outputs described in the dynamic web service description. Using the form template, a user of Client 300 designs 1630 one or more forms to collect, display, and/or validate data corresponding to inputs and/or outputs described in the dynamic web service description. (See, e.g., FIG. 9, discussed above.)

Once one or more forms have been designed, Client 300 sends to Workflow Server 1500 one or more form definitions 1635, task definitions 1640, associations 1643 between form definitions and task definitions, business actor role designations 1645, and actor/task assignments 1650. In some embodiments, may further send additional business-process-related data, such as sequencing information.

Figure 18:
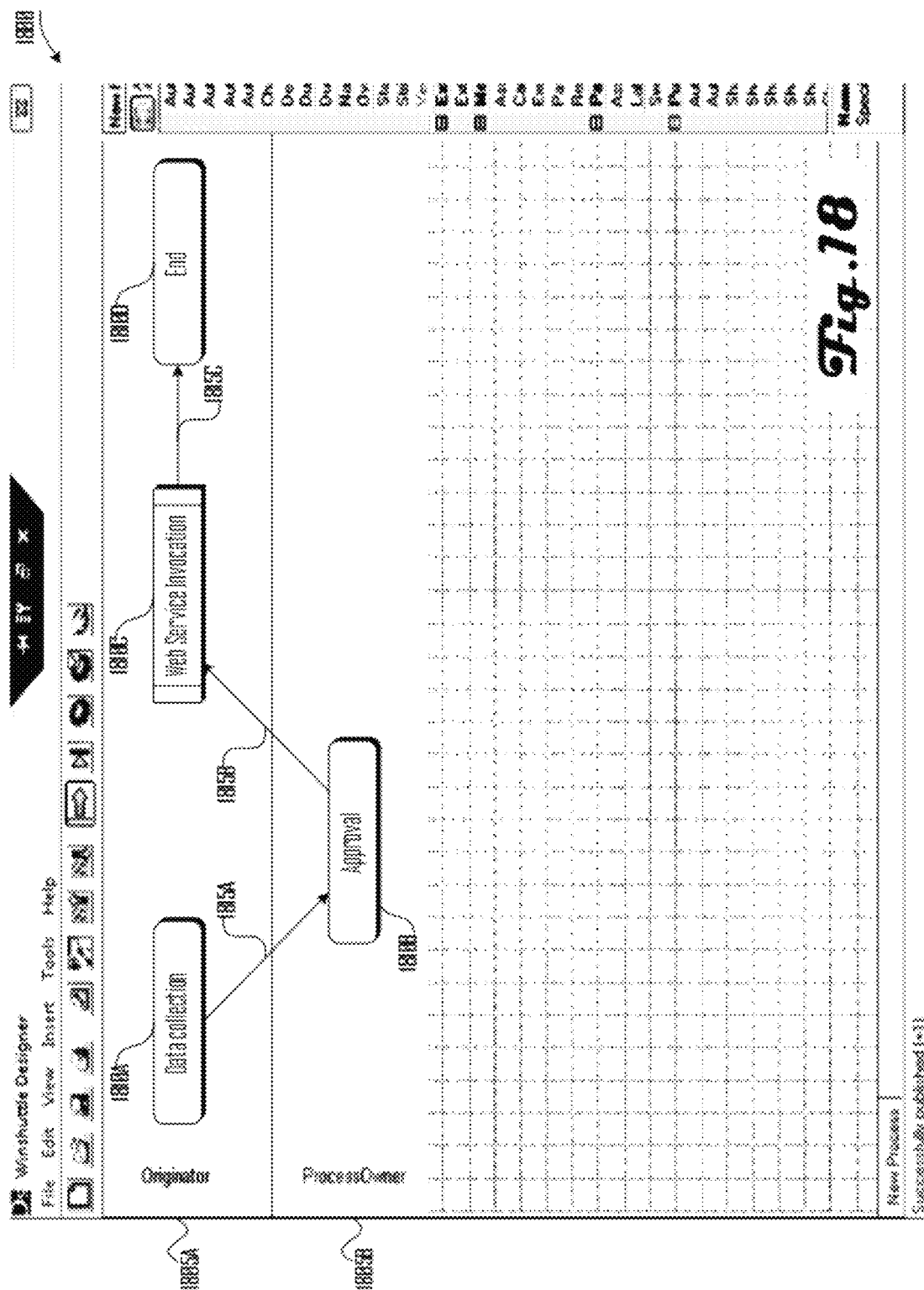
FIG. 18 illustrates a user interface such as may be employed by an exemplary workflow designer application, in accordance with one embodiment.

For example, FIG. 18 illustrates a user interface 1800 such as may be employed by an exemplary workflow designer application, in accordance with one embodiment. User interface 1800 includes configurable "swim lanes" 1805A-B representing designated business actor roles. Configurable task-controls 1810A-D represent different task definitions, each of which has been assigned to a particular business actor role, as configurably indicated by the task control's being positioned within a particular swim lane. (Although in the illustrated user interface, task control 1810C represents an automatic task that is only nominally assigned to the business actor role represented by swim lane 1805A.) Further, task sequence controls 1815A-C depict task sequencing data indicating a configurable sequence in which tasks represented by task-controls 1810A-D are to be performed.

User interface 1800 depicts a simple business process definition, but similar user interfaces could also be used to define more complex business processes involving additional business actor roles, non-linear task sequencing, and the like.

Referring again to FIG. 16, Workflow Server 1500 stores 1655 (e.g., in business process data store 120) a definition for a reusable business process or work flow corresponding to these definitions, associations, designations, and assignments. Workflow Server 1500 then sends to Client 300 an identifier 1660 that Client 300 (or others) can use to subsequently invoke the stored business process.

Figure 19:
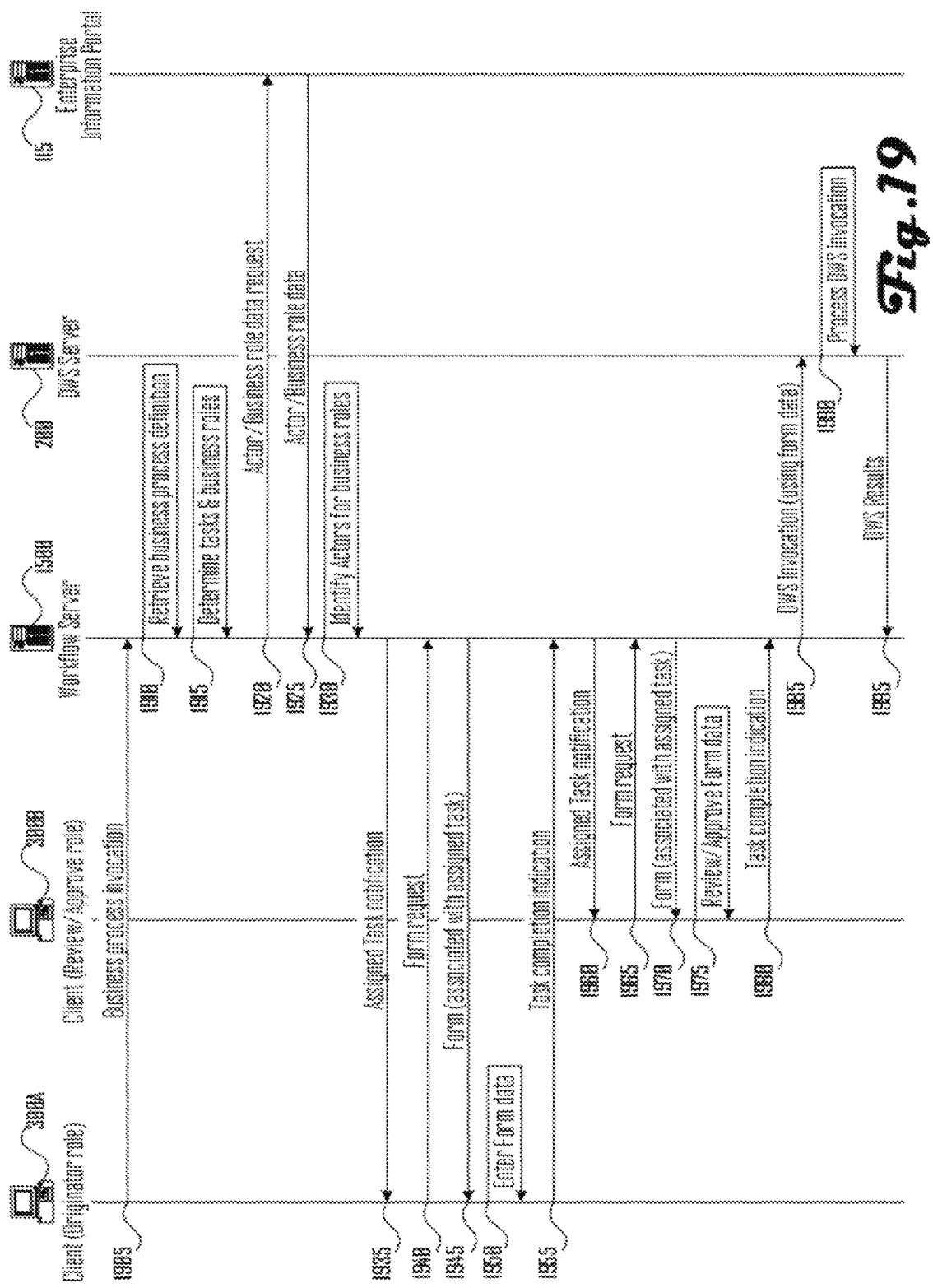
FIG. 19 illustrates an exemplary series of communications between Clients, Workflow Server, DWS Server, and Enterprise Information Portal, in accordance with one embodiment.

FIG. 19 illustrates an exemplary series of communications between Clients 300A-B, Workflow Server 1500, DWS Server 200, and Enterprise Information Portal 115, in accordance with one embodiment in which Workflow Server 1500 manages a stored business process.

Client 300A sends to Workflow Server 1500 an invocation 1905 of a stored reusable business process, the invocation including an identifier identifying the stored business process. Workflow Server 1500 retrieves the invoked business-process definition (e.g., from business process data store 120)

and determines the tasks defined within the business process and the business actor roles to which the tasks have been assigned.

Workflow Server 1500 sends to Enterprise Information Portal 115 at least one request 1902 for data related to actors (or groups of actors) who may be able to fill the various business actor roles. Enterprise Information Portal 115 responds with data 1925 related to actors (or groups of actors) who may be able to fill the various business actor roles, and Workflow Server 1500 identifies one or more actors to fill the various business actor roles defined in the business process.

For example, if a task is assigned to an "Accounting Manager" business actor role, Workflow Server 1500 may query Enterprise Information Portal 115 to identify one or more suitable individuals within an enterprise.

In the illustrated scenario, the business process includes two actor-assigned tasks assigned to two business roles to be respectively filled by the operators of Clients 300A and B (in that sequence).

Workflow Server 1500 sends to Client 300A a task notification 1935 notifying the operator of Client 300A that he or she has been assigned a task as part of the invoked business process.

Figure 20:
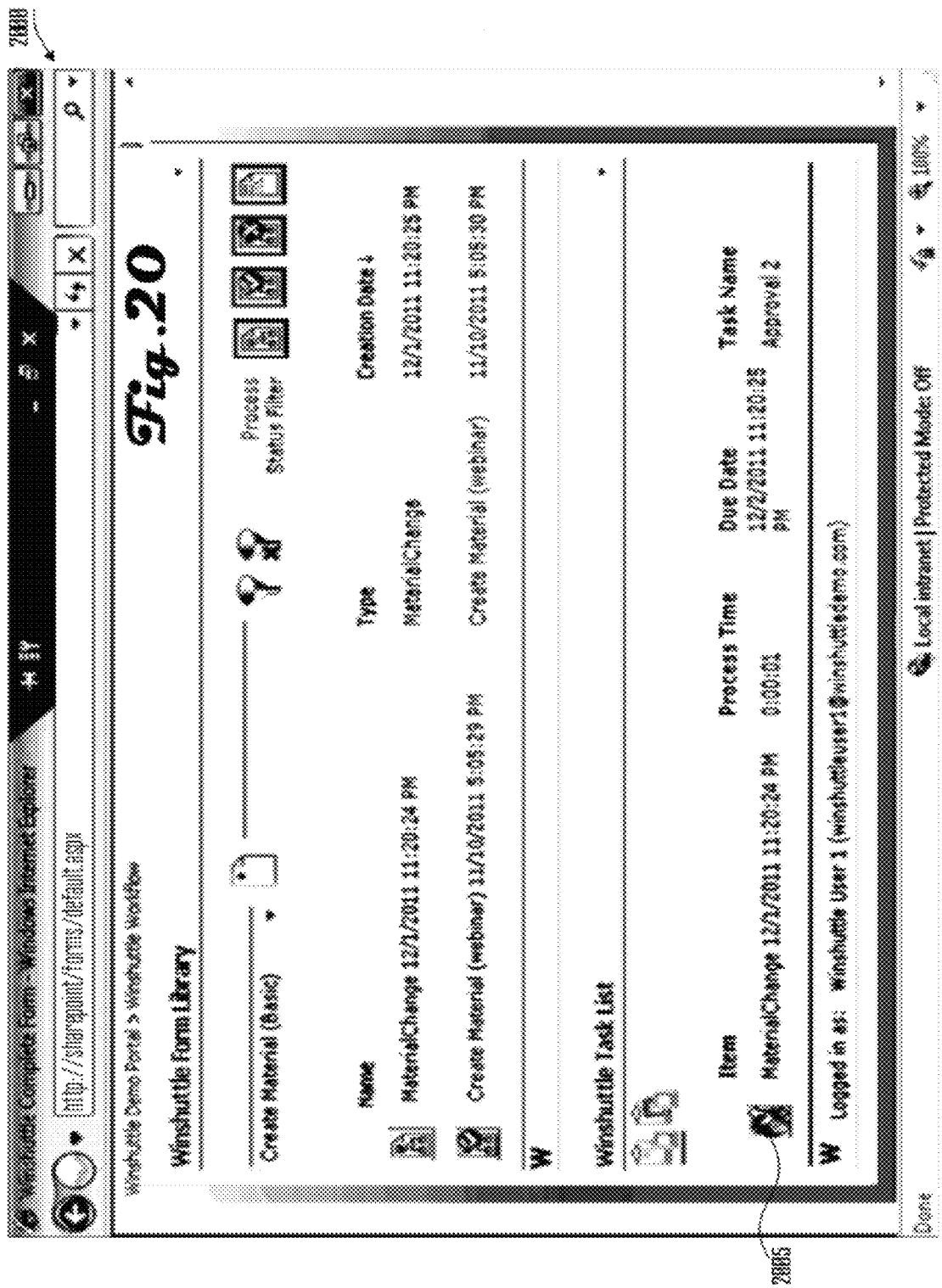
FIG. 20 illustrates a user interface for, among other things, notifying a user that the user has been assigned a task as part of a business process, in accordance with one embodiment.

For example, FIG. 20 illustrates a user interface 2000 showing (among other things) a task notification 2005 indicating to an enterprise actor that he or she has been assigned a task as part of a business process.

Referring again to FIG. 19, when the actor operating Client 300A takes up the assigned task, Client 300A sends to Workflow Server 1500 a request 1940 for a form associated with the assigned task, to which Workflow Server 1500 responds by sending the form 1945 associated with the assigned task. (See, e.g., FIG. 10, discussed above.)

In the illustrated sequence, the task assigned to the actor operating Client 300A involves entering data 1950 into the form. Once the actor operating Client 300A has completed the task of entering data, Client 300A sends to Workflow Server 1500 an indication 1955 that the assigned task has been completed.

Determining that the next pending task in the business process is assigned to the actor operating Client 300B, Workflow Server 1500 sends to Client 300B a task notification 1960 notifying the operator of Client 300B that he or she has been assigned a task as part of the invoked business process. (See, e.g., FIG. 20, discussed above.)

When the actor operating Client 300B takes up the assigned task, Client 300B sends to Workflow Server 1500 a request 1965 for a form associated with the assigned task, to which Workflow Server 1500 responds by sending the form 1970 associated with the assigned task. (See, e.g., FIG. 10, discussed above.)

In the illustrated sequence, the task assigned to the actor operating Client 300B involves reviewing and/or approving 1975 form data. Once the actor operating Client 300B has completed the task of reviewing and/or approving data, Client 300B sends to Workflow Server 1500 an indication 1980 that the assigned task has been completed.

Determining that the next pending task in the business process is an automatic task to invoke a dynamic web service associated with the business process, Workflow Server 1500 sends to DWS Server 200 an invocation 1985 invoking a dynamic web service using data from form associated with the business process.

DWS Server 200 processes the invocation (see, e.g., routine 1400, illustrated in FIG. 14 and discussed above), including communicating with ERP Server 110 (not shown). DWS Server 200 returns transaction results (if any) to Workflow Server 1500. In some embodiments, the business process may call for dynamic web service transaction results to be presented to an actor and/or subjected to further tasks (not shown).

Figure 21:
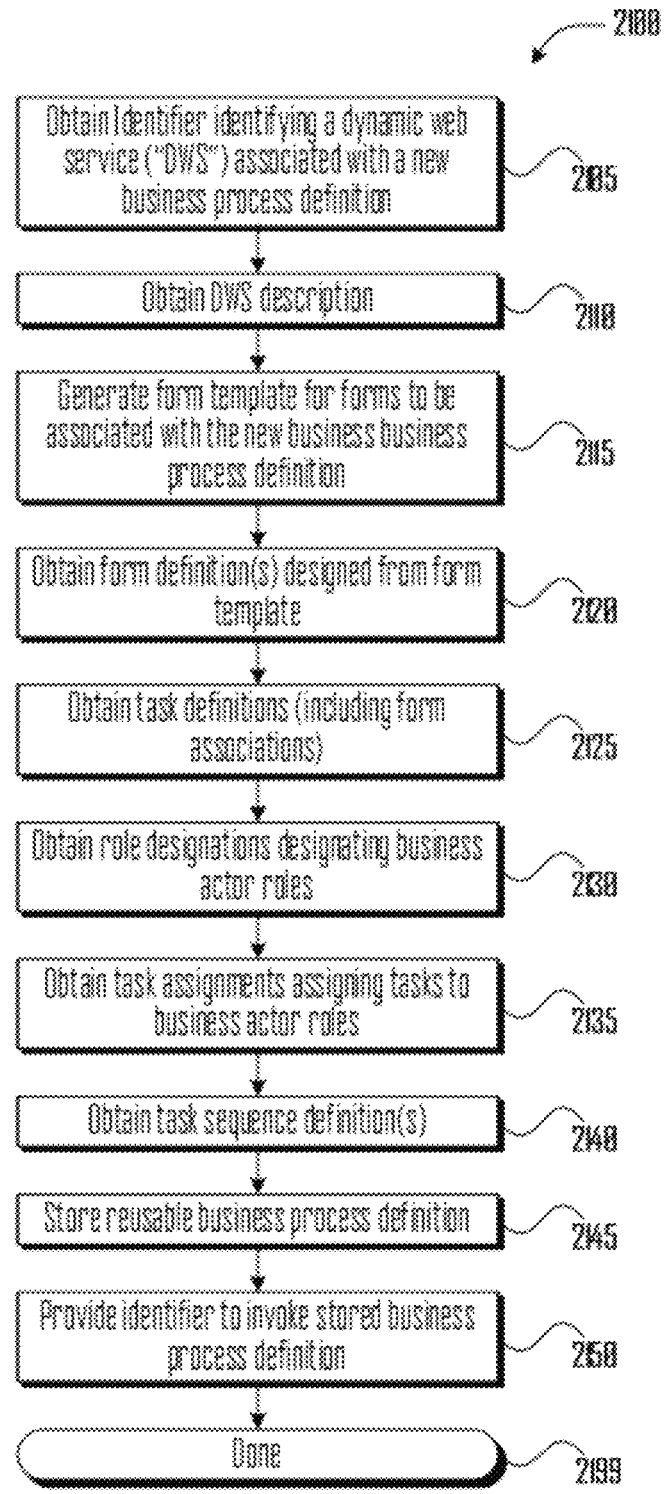
FIG. 21 illustrates a business process definition routine in accordance with one embodiment.

FIG. 21 illustrates a business process definition routine 2100, such as may be performed by Workflow Server 1500 in accordance with one embodiment. In block 2105, routine 2100 obtains an identifier identifying a dynamic web service to be associated with a new business process definition.

In block 2110, routine 2100 obtains a description (e.g., (e.g., a WSDL XML schema) corresponding to the identified dynamic web service. For example, in one embodiment, routine 2100 may retrieve the dynamic web service description from a dynamic web service server (e.g., DWS Server 200).

In some embodiments, each task in a business process may be associated with a form for collecting, displaying, reviewing/approving, and/or submitting data associated with the task. In block 2115, routine 2100 generates a form template configured to use inputs and/or outputs described in the dynamic web service description. (See, e.g., FIG. 17, discussed above.)

In block 2120, routine 2100 obtains one or more form definitions designed from the form template generated in block 2115. For example, in one embodiment, routine 2100 may provide the form template to a client device, where an operator may design a form using a forms-authoring tool such as described above in respect to FIG. 9. In some embodiments, one or more forms may include a control by which an operator can manually invoke the dynamic web service to obtain, submit, and/or validate form data.

In block 2125, routine 2100 obtains a plurality of task definitions defining a plurality of tasks that collectively make up the business process. For example, using a workflow designer tool such as that illustrated in FIG. 18, discussed above, an operator may define several tasks, including actor-assigned tasks such as collecting and/or entering form data; viewing, reviewing, and/or approving form data; validating form data, and the like. Additionally, in some embodiments, an operator may define tasks to be automatically performed by a workflow engine (e.g., automatically invoking a dynamic web service based on form data).

In block 2130, routine 2100 obtains a plurality of role designations designating a plurality of business actor roles. (See, e.g., swim lanes 1805A-B, as shown in FIG. 18, discussed above.) For example, in one embodiment, business actor roles may be determined according to an enterprise's organization chart, as may be accessible via an enterprise information portal (e.g., Enterprise Information Portal 115). In some cases, a business actor role may correspond to a particular individual actor (e.g., Joe Smith in accounting, the actor who invoked the business process, or the like) within an enterprise. In other cases, a business actor role may represent a class of actors (e.g., accounting managers, the materials department, or the like). In some embodiments, an "automatic" actor role may be used to represent tasks to be automatically performed by a workflow engine during the performance of the business process.

In block 2135, routine 2100 obtains task assignments respectively assigning the tasks defined in block 2125 to business actor roles designated in block 2130. For example, using a workflow designer tool such as that illustrated in FIG. 18, discussed above, an operator may assign tasks to a business actor role by positioning task controls within actor-role swim lanes.

In block 2140, routine 2100 obtains sequencing information indicating a sequence in which tasks are to be performed. For example, using a workflow designer tool such as that illustrated in FIG. 18, discussed above, an operator may employ task sequence controls 1815A-C to indicate a task sequence. In various embodiments, task sequencing information may include conditional sequences, iterative sequences, series and/or parallel sequences, and/or other like sequencing control structures.

In block 2145, routine 2100 stores (e.g., in business process data store 120) a reusable business process definition corresponding to the data obtained in blocks 2120-2140.

In block 2150, routine 2100 provides an identifier that can be used to subsequently invoke the stored business process. Routine 2100 ends in block 2199.

Figure 22:
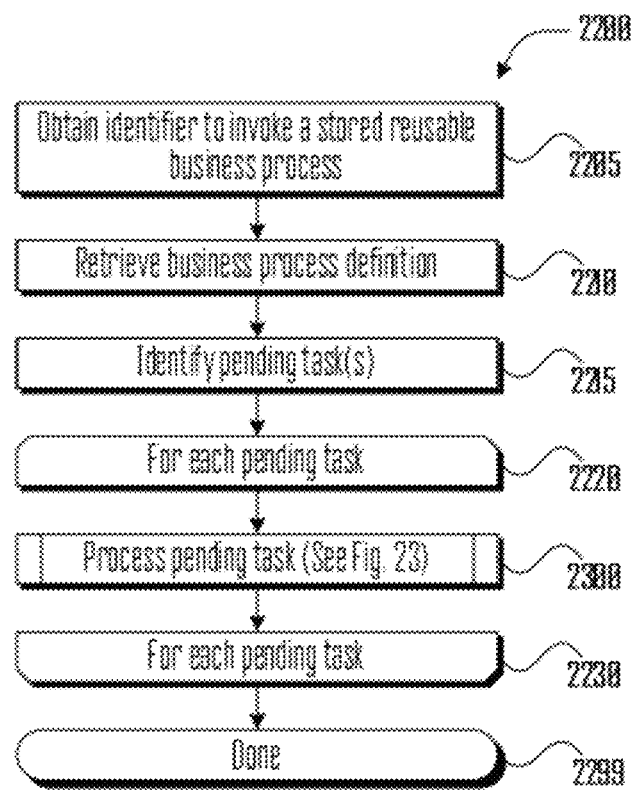
FIG. 22 illustrates a routine for running a stored reusable business process, such as may be performed by Workflow Server in accordance with one embodiment.

FIG. 22 illustrates a routine 2200 for running a stored reusable business process, such as may be performed by Workflow Server 1500 in accordance with one embodiment. In block 2205, routine 2200 obtains an identifier to invoke a stored reusable business process. Using the identifier, in block 2210, routine 2200 retrieves a corresponding business process definition (e.g., from business process data store 120).

In block 2215, routine 2200 identifies among the tasks defined within the business process definition one or more pending tasks (here, tasks that have no preceding tasks or other precondition that must be satisfied before they are in condition to be performed). For example, in the business process illustrated in FIG. 18, discussed above, routine 2200 would identify task 1810A as being initially pending.

Beginning in opening loop block 2220, routine 2200 processes each pending task identified in block 2215. In subroutine block 2300 (see FIG. 23, discussed below), routine 2200 processes the current pending task. In closing loop block 2230, routine 2200 iterates back to opening loop block 2220 to process the next pending task identified in block 2215 (if any). Once all pending tasks identified in block 2215 have been processed, routine 2200 ends in block 2299.

Figure 23:
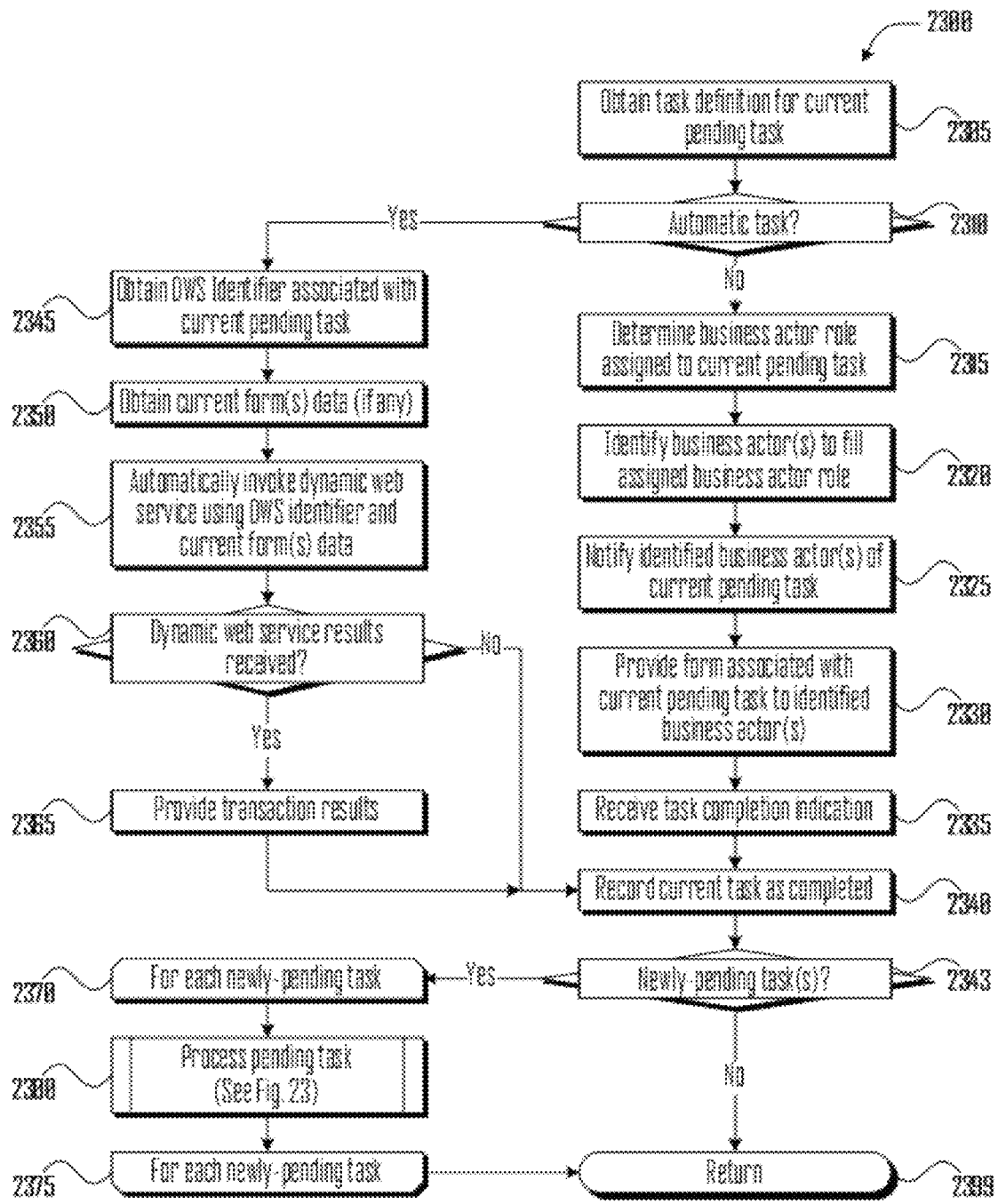
FIG. 23 illustrates a pending task processing subroutine, such as may be performed by Workflow Server in accordance with one embodiment.

FIG. 23 illustrates a pending task processing subroutine 2300, such as may be performed by Workflow Server 1500 in accordance with one embodiment. In block 2305, subroutine 2300 obtains (from the business process definition) a task definition for the current pending task. In decision block 2310, subroutine 2300 determines whether the current pending task is to be automatically performed (such as by automatically invoking a dynamic web service), as opposed to being assigned to a business actor role to be filled by a human actor.

If the current pending task is to be automatically performed, then in block 2345, subroutine 2300 obtains (from the task and/or business process definition) a dynamic web service identifier associated with the current pending task.

As discussed variously above, a dynamic web service may have one or more input and/or output fields that are mapped to one or more form fields of one or more forms associated with the business process. In block 2350, subroutine 2300 obtains form data that corresponds to input fields (if any) of the dynamic web service.

In block 2355, subroutine 2300 automatically invokes the dynamic web service using the dynamic web service identifier obtained in block 2345 and the form data (if any) obtained in block 2350.

In decision block 2360, subroutine 2300 determines whether it received transaction results from its invocation of the dynamic web service. If not, then in block 2340, subroutine 2300 records the current formerly-pending task as being completed. If so, then in block 2365, subroutine 2300 provides the transactions results (e.g., by populating one or more form fields) before recording the current formerly-pending task as being completed in block 2365.

On the other hand, if in decision block 2310, subroutine 2300 determines that the current pending task is not to be automatically performed, then in block 2315, subroutine 2300 determines which business actor role the current pending task is assigned to, and in block 2320, subroutine 2300 identifies one or more business actors to fill that role. For example, in one embodiment, subroutine 2300 may consult an enterprise information portal (e.g., Enterprise Information Portal 115) to identify one or more actors to fill the business actor role.

In block 2325, subroutine 2300 notifies the identified business actor(s) of the current pending task that is assigned to the actor(s). (See, e.g., FIG. 20, discussed above.) Once the identified business actor(s) has/have undertaken the current pending task, in block 2330, subroutine 2300 provides a form associated with the current pending task to the actor(s). (See, e.g., FIG. 10, discussed above.)

Once the task has been completed by the identified business actor(s), in block 2335, subroutine 2300 receives a task completion indication, and in block 2340, subroutine 2300 records the current formerly-pending task as being completed.

In decision block 2343, subroutine 2300 determines whether the completion of the current formerly-pending task has put one or more uncompleted tasks in condition to be performed. For example, in the business process illustrated in FIG. 18, discussed above, once task 1810A has been completed, task 1810B (the next task in series) would be put into condition to be performed. If no uncompleted tasks have been put into condition to be performed, then subroutine 2300 ends in block 2399, returning to the caller.

However, if in decision block 2343, subroutine 2300 identifies one or more newly-pending tasks that have been put into condition to be performed be the completion (block 2340) of the current formerly-pending task, then beginning in opening loop block 2370, subroutine 2300 processes each of the newly-pending tasks. In subroutine block 2300, subroutine 2300 calls itself to process the current newly-pending task. In closing loop block 2375, subroutine 2300 iterates back to opening loop block 2220 to process the next newly-pending task identified in block 2343 (if any). (Although this process is depicted as recursive for illustration purposes, other embodiments may employ different control structures to process tasks in an appropriate sequence.)

Once all newly-pending tasks have been processed, subroutine 2300 ends in block 2399, returning to the caller.

Although specific embodiments have been illustrated and described herein, it will be appreciated by those of ordinary skill in the art that a whole variety of alternate and/or equivalent implementations may be substituted for the specific embodiments shown and described without departing from the scope of the present invention. For example, although the description above refers to embodiments involving enterprise resource planning systems, other embodiments may be similarly used in other types of enterprise application systems in which a transaction between an enterprise client and an enterprise server may be recorded and mapped, as variously described above. For example, the systems and methods described herein may be used in connection with enterprise systems such as customer relationship management ("CRM") systems, accounting systems, supply chain management systems, and the like. This application is intended to cover any adaptations or variations of the embodiments discussed herein.

What is claimed is:

1. A computer-implemented method for automating a business process, the method comprising:

obtaining, by the computer, a service description framework describing a dynamic web service for invoking a previously-recorded business transaction associated with the business process, said service description framework describing a plurality of transaction data fields;

obtaining, by the computer, one or more form definitions defining at least one transaction form having at least one form field for collecting and/or displaying data corresponding to one of said plurality of transaction data fields;

obtaining, by the computer, a plurality of task definitions respectively defining a plurality of tasks that collectively make up at least a portion of the business process, each of said plurality of tasks being associated with at least one of said one or more form definitions;

obtaining, by the computer, a plurality of role designations respectively designating a plurality of business actor roles for collectively performing the business process;

obtaining, by the computer, a plurality of task assignments, each assigning at least one of said plurality of tasks to be performed by at least one of said plurality of business actor roles; and storing, by the computer to a data store, a reusable business process definition comprising said one or more form definitions, said plurality of task definitions, said plurality of role designations, and said plurality of task assignments; and wherein at least one of said plurality of tasks includes invoking, via said dynamic web service, said recorded business transaction to automatically perform at least one of the following operations:
  retrieve data from an Enterprise Application system to populate said form field;
  validate data from said form field against data stored in said Enterprise Application system; and
  store data from said form field into said Enterprise Application system.

2. The method of claim 1, further comprising obtaining a sequence definition defining a sequence for said plurality of tasks when performing the business process; and
  wherein said reusable business process definition further comprises said sequence definition.

3. The method of claim 2, further comprising:
  in response to receiving an indication to perform the business process, retrieving said reusable business process definition from said data store; and
  invoking a workflow engine to process each of said plurality of tasks in said sequence defined by said sequence definition.

4. The method of claim 3, wherein processing a current one of said plurality of tasks comprises, when a determined one of said plurality of business actor roles is assigned to the current task, said workflow engine:
  identifying at least one business actor to fill the determined business actor role;
  notifying the identified at least one business actor to perform the current task; and
  when the identified at least one business actor has completed the current task, proceeding to the next task, if any, in said sequence defined by said sequence definition.

5. The method of claim 4, wherein identifying said at least one business actor comprises said workflow engine obtaining business actor and business actor role data from an enterprise information portal with which said workflow engine is integrated.

6. The method of claim 3, wherein processing a current one of said plurality of tasks comprises, when none of said plurality of business actor roles is assigned to the current task, automatically performing the current task by said workflow engine.

7. The method of claim 6, wherein said automatically performing the current task by the workflow engine includes said invoking, via said dynamic web service, said recorded business transaction.

8. The method of claim 1, further comprising obtaining an automatic task assignment assigning at least one of said plurality of tasks to be performed automatically, rather than by one of said plurality of business actor roles.

9. The method of claim 8, wherein said automatically-performed task includes said invoking, via said dynamic web service, said recorded business transaction.

10. The method of claim 1, wherein said transaction form includes a control that invokes, via said dynamic web service, said recorded business transaction when said control is activated by a business actor in one of said plurality of business actor roles in the course of said business actor's performing an assigned one of said plurality of tasks.

11. The method of claim 1, wherein said plurality of business actor roles include at least one of a data entry role, a data review role, a data validation role, and an approval role.

12. The method of claim 1, wherein said Enterprise Application system comprises an Enterprise Resource Planning server.

13. A non-transient computer-readable storage medium having stored thereon instructions that, when executed by a processor, perform the method of claim 1.

14. A computing apparatus comprising a processor and a memory having stored thereon instructions that, when executed by the processor, perform the method of claim 1.

* * * * *